(12) United States Patent
Mizuta et al.

(10) Patent No.: US 10,525,521 B2
(45) Date of Patent: Jan. 7, 2020

(54) METHOD OF MANUFACTURING ROLLING BEARING RING AND ROLLING BEARING RING

(71) Applicant: NTN CORPORATION, Osaka-shi, Osaka (JP)

(72) Inventors: Kohei Mizuta, Kuwana (JP); Chikara Ohki, Kuwana (JP)

(73) Assignee: NTN CORPORATION, Osaka (JP)

( * ) Notice: Subject to any disclaimer, the term of this patent is extended or adjusted under 35 U.S.C. 154(b) by 197 days.

(21) Appl. No.: 15/324,583

(22) PCT Filed: Jul. 3, 2015

(86) PCT No.: PCT/JP2015/069290
§ 371 (c)(1),
(2) Date: Jan. 6, 2017

(87) PCT Pub. No.: WO2016/006550
PCT Pub. Date: Jan. 14, 2016

(65) Prior Publication Data
US 2017/0203354 A1    Jul. 20, 2017

(30) Foreign Application Priority Data

Jul. 10, 2014 (JP) .................. 2014-142179
Feb. 20, 2015 (JP) .................. 2015-031556

(51) Int. Cl.
*B21D 53/10* (2006.01)
*F16C 19/30* (2006.01)
(Continued)

(52) U.S. Cl.
CPC .............. *B21D 53/10* (2013.01); *F16C 19/10* (2013.01); *F16C 19/30* (2013.01); *F16C 33/588* (2013.01);
(Continued)

(58) Field of Classification Search
CPC ........ B21D 53/10; F16C 19/10; F16C 33/588; F16C 19/30; F16C 33/64; F16C 2220/84
See application file for complete search history.

(56) References Cited

U.S. PATENT DOCUMENTS

| | | | |
|---|---|---|---|
| 3,424,893 A | * | 1/1969 | Anderson .............. B21D 19/08 219/149 |
| 4,462,144 A | * | 7/1984 | White .................... B21D 53/10 29/898.055 |

(Continued)

FOREIGN PATENT DOCUMENTS

| | | |
|---|---|---|
| CN | 1267247 A | 9/2000 |
| CN | 102149932 A | 8/2011 |

(Continued)

OTHER PUBLICATIONS

Machine Translation for Ide, JP 2013-194292 A, Sep. 2013.*

(Continued)

*Primary Examiner* — Ryan J. Walters
*Assistant Examiner* — Christine Pellazar Bersabal
(74) *Attorney, Agent, or Firm* — McDermott Will & Emery LLP

(57) ABSTRACT

A method of manufacturing a rolling bearing ring includes preparing a coil material and a press machine for obtaining a rolling bearing ring from the coil material, setting the coil material on the press machine, and obtaining the rolling bearing ring by heating the coil material on the press machine to a temperature not lower than an $A_1$ transformation point, thereafter punching a part of the coil material into a ring form, and thereafter quenching a formed object on the press machine.

14 Claims, 28 Drawing Sheets

(51) Int. Cl.
*F16C 33/64* (2006.01)
*F16C 33/58* (2006.01)
*F16C 19/10* (2006.01)

(52) U.S. Cl.
CPC .......... *F16C 33/64* (2013.01); *F16C 2220/84* (2013.01); *F16C 2223/10* (2013.01)

(56) References Cited

U.S. PATENT DOCUMENTS

| | | |
|---|---|---|
| 6,502,486 B1 | 1/2003 | Tenbrack et al. |
| 7,666,346 B2 | 2/2010 | Maeda |
| 2003/0229987 A1 | 12/2003 | Andersson et al. |
| 2006/0226584 A1 | 10/2006 | Maeda |
| 2011/0035943 A1 | 2/2011 | Pohlman et al. |
| 2015/0024144 A1 | 1/2015 | Rollmann et al. |

FOREIGN PATENT DOCUMENTS

| | | | |
|---|---|---|---|
| CN | 102688944 A | 9/2012 | |
| CN | 104284737 A | 1/2015 | |
| JP | 07-54852 A | 2/1995 | |
| JP | 08-284951 A | 11/1996 | |
| JP | 09-176740 A | 7/1997 | |
| JP | 10-58073 A | 3/1998 | |
| JP | 2002-503788 A | 2/2002 | |
| JP | 2003-334629 A | 11/2003 | |
| JP | 2006-089795 A | 4/2006 | |
| JP | 2006-250327 A | 9/2006 | |
| JP | 2006-291249 A | 10/2006 | |
| JP | 2007-170447 A | 7/2007 | |
| JP | 2007-170448 A | 7/2007 | |
| JP | 2007170447 A * | 7/2007 | ............. F16C 19/30 |
| JP | 2008-296262 A | 12/2008 | |
| JP | 2012-013210 A | 1/2012 | |
| JP | 2013-164093 A | 8/2013 | |
| JP | 2013-194292 A | 9/2013 | |
| JP | 2013194292 A * | 9/2013 | ............. F16C 33/64 |

OTHER PUBLICATIONS

Machine Translation for Yamashita (JP 2007170447 A) (Year: 2007).*

Japanese Decision to Grant issued in corresponding Japanese Patent Application No. 2015-031556, dated Sep. 25, 2018, with English Translation.

Search Report issued in International Patent Application No. PCT/JP2015/069290, dated Aug. 25, 2015.

Office Action issued in corresponding Chinese Patent Application No. 201580037532.5, dated Jan. 29, 2018.

Extended European Search Report issued in corresponding EP Patent Application No. 15818493.7, dated Jan. 22, 2018.

Office Action issued in corresponding Japanese Patent Application No. 2014-142179, dated Apr. 24, 2018.

Chinese Office Action issued in corresponding Chinese Patent Application No. 201580037532.5, dated Mar. 19, 2019, with English Translation.

* cited by examiner

METHOD OF MANUFACTURING ROLLING BEARING RING AND ROLLING BEARING RING

CROSS REFERENCE

This application is the U.S. National Phase under 35 U.S.C. § 371 of International Application No. PCT/JP2015/069290, filed on Jul. 3, 2015, which claims the benefit of Japanese Application No. 2014-142179, filed on Jul. 10, 2014, and Japanese Application No. 2015-031556, filed on Feb. 20, 2015, the entire contents of each are hereby incorporated by reference.

TECHNICAL FIELD

The present invention relates to a method of manufacturing a rolling bearing ring and a rolling bearing ring. The present invention particularly relates to a method of manufacturing a rolling bearing ring which achieves a shortened manufacturing process and a rolling bearing ring manufactured with the method of manufacturing a rolling bearing ring.

BACKGROUND ART

A rolling bearing ring of a thrust needle bearing has conventionally been manufactured in a process below. Initially, a coil material obtained by winding up like a coil, a rolled steel material in a form of a thin plate is prepared. Then, the coil material is sequentially punched and formed. Thus, a formed object in a ring form having an approximate shape of a rolling bearing ring is obtained. Then, a setup step before heat treatment is performed. Then, the formed object in the ring form is subjected to heat treatment such as carburization. Thereafter, the formed object is quenched by cooling the formed object with air blast. Finally, the formed object is shaped by press-tempering the quenched formed object (tempering). A rolling bearing ring of a thrust needle bearing is manufactured in the process as above.

Die quenching has been known as a technique for forming a steel material. Die quenching is a technique for press-forming a heated steel material and simultaneously quenching the steel material by rapidly cooling the steel material in a die (for example, PTD 1).

CITATION LIST

Patent Document

PTD 1: Japanese Patent Laying-Open No. 2008-296262

SUMMARY OF INVENTION

Technical Problem

As above, the conventional process for manufacturing a rolling bearing ring of a thrust needle bearing includes many steps such as punching, forming, heat treatment, quenching, and tempering. Since the rolling bearing ring of the thrust needle bearing is small in thickness, the setup step before heat treatment is bothersome. Thus, cost for manufacturing a rolling bearing ring has conventionally been high due to many steps in the manufacturing process. Therefore, it is required to be able to provide a more inexpensive rolling bearing ring by shortening the process for manufacturing a rolling bearing ring to thereby reduce manufacturing cost.

The present invention was made in view of the problems above and an object is to provide a method of manufacturing a rolling bearing ring which achieves a shortened manufacturing process. Another object of the present invention is to provide a more inexpensive rolling bearing ring of which manufacturing cost has been reduced.

Solution to Problem

A method of manufacturing a rolling bearing ring according to the present invention includes preparing a steel material and a forming table for obtaining the rolling bearing ring from the steel material, setting the steel material on the forming table, and obtaining the rolling bearing ring by heating the steel material on the forming table to a temperature not lower than an $A_1$ transformation point, thereafter punching a part of the steel material into a ring form, and thereafter quenching the steel material in the ring form on the forming table.

In the method of manufacturing a rolling bearing ring according to the present invention, steps of heating, punching, and quenching a steel material are all performed as one step on the forming table. Therefore, a manufacturing process can be shorter than in the conventional method of manufacturing a rolling bearing ring in which the steps are separately performed. Consequently, cost for manufacturing a rolling bearing ring can further be reduced and a more inexpensive rolling bearing ring can be provided. Thus, according to the method of manufacturing a rolling bearing ring according to the present invention, the process for manufacturing a rolling bearing ring can be shortened.

In the method of manufacturing a rolling bearing ring, the steel material in the ring form may be quenched by bringing the steel material into contact with the forming table. The steel material can thus more easily be quenched.

In the method of manufacturing a rolling bearing ring, the steel material in the ring form may be formed on the forming table before quenching. Thus, steps of heating, punching, forming, and quenching the steel material can all be performed as one step on the forming table. Consequently, the process for manufacturing a rolling bearing ring can further be shortened.

In the method of manufacturing a rolling bearing ring, in forming, an inner circumferential portion or an outer circumferential portion of the steel material in the ring form may be bent to be oriented in a direction of thickness of the steel material in the ring form. Thus, a rolling bearing ring for a thrust bearing in which the inner circumferential portion or the outer circumferential portion of the ring form is bent in the direction of thickness can be manufactured.

In the method of manufacturing a rolling bearing ring, the steel material may be heated with at least any method selected from the group consisting of electrical heating, induction heating, contact heat transfer, and far-infrared heating. In the method of manufacturing a rolling bearing ring, any heating method can thus be adopted as the method of heating the steel material.

In the method of manufacturing a rolling bearing ring, in electrical heating, the steel material may be heated by heat generation resulting from supply of a direct current (DC) or an alternating current (AC) to the steel material. Thus, in electrical heating, any of a direct current and an alternating current can be adopted.

In the method of manufacturing a rolling bearing ring, the steel material may contain at least 0.4 mass % of carbon. A rolling bearing ring having a high hardness after it is quenched can thus be manufactured.

In the method of manufacturing a rolling bearing ring, the steel material may have a thickness not greater than 2 mm. The steel material may be punched into the ring form in a direction of thickness. By thus employing a steel material relatively small in thickness, punching of the steel material can be facilitated and the steel material can sufficiently be quenched.

In the method of manufacturing a rolling bearing ring, the rolling bearing ring having a hardness not lower than 700 HV may be obtained. Thus, in the method of manufacturing a rolling bearing ring, the manufacturing process is shortened and a rolling bearing ring high in hardness after it is quenched can be manufactured by sufficiently quenching the steel material.

A rolling bearing ring according to the present invention is manufactured with the method of manufacturing a rolling bearing ring according to the present invention. In the method of manufacturing a rolling bearing ring, manufacturing cost can further be reduced by shortening the manufacturing process as above. Therefore, according to the rolling bearing ring according to the present invention, a more inexpensive rolling bearing ring of which manufacturing cost has been reduced can be provided.

The rolling bearing ring may be a rolling bearing ring included in a thrust bearing. Thus, an inexpensive thrust bearing having the rolling bearing ring can be provided.

Advantageous Effects of Invention

As is clear from the description above, according to the method of manufacturing a rolling bearing ring according to the present invention, a process for manufacturing a rolling bearing ring can further be shortened. According to the rolling bearing ring according to the present invention, a more inexpensive rolling bearing ring of which manufacturing cost has been reduced can be provided.

DESCRIPTION OF EMBODIMENTS

Figure 1:
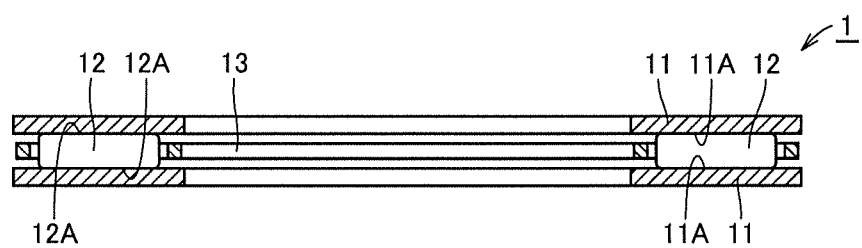
FIG. 1 is a schematic cross-sectional view showing a construction of a thrust needle roller bearing according to a first embodiment of the present invention.

An embodiment of the present invention will be described hereinafter with reference to the drawings. The same or corresponding elements in the drawings below have the same reference characters allotted and description thereof will not be repeated.

First Embodiment

A construction of a thrust needle roller bearing 1 according to one embodiment of the present invention will initially be described. FIG. 1 shows a structure in a cross-section along an axial direction of thrust needle roller bearing 1. Referring to FIG. 1, thrust needle roller bearing 1 mainly has a pair of rolling bearing rings 11, a plurality of needle rollers 12, and a retainer 13.

Rolling bearing ring 11 is composed, for example, of steel in which a concentration of carbon is not lower than 0.4 mass %, and is in a disc shape. Rolling bearing ring 11 has a rolling bearing ring raceway surface 11A with which needle roller 12 is in contact at one main surface. The pair of rolling bearing rings 11 is arranged such that rolling bearing ring raceway surfaces 11A are opposed to each other.

Needle roller 12 is composed of steel and has a roller rolling contact surface 12A at an outer circumferential surface. As shown in FIG. 1, needle roller 12 is arranged between the pair of rolling bearing rings 11 such that roller rolling contact surface 12A is in contact with rolling bearing ring raceway surface 11A.

Retainer 13 is composed, for example, of a resin, and retains a plurality of needle rollers 12 at a prescribed pitch in a circumferential direction of rolling bearing ring 11. More specifically, retainer 13 has a plurality of pockets (not shown) in an annular shape provided at an equal interval in the circumferential direction. Retainer 13 accommodates needle roller 13 in the pocket.

A plurality of needle rollers 12 are rollably retained by retainer 13 on an annular raceway surface along the circumferential direction of rolling bearing ring 11. With the construction above, thrust needle roller bearing 1 is constructed such that a pair of rolling bearing rings 11 can rotate relatively to each other. Rolling bearing ring 11 is manufactured with a method of manufacturing a rolling bearing ring according to the present embodiment described below.

Figure 2:
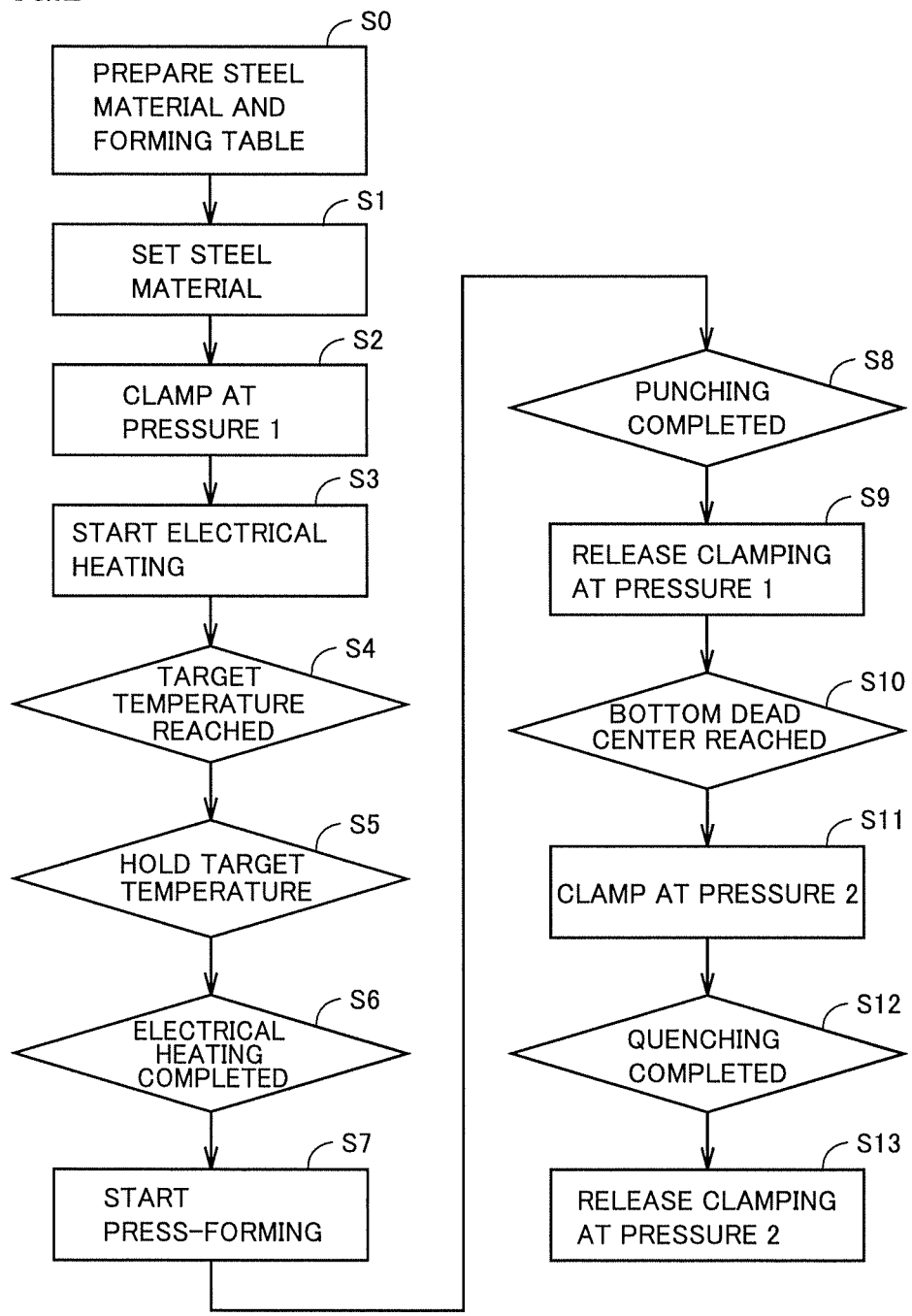
FIG. 2 is a flowchart schematically showing a method of manufacturing a rolling bearing ring according to the first embodiment of the present invention.
Figure 3:
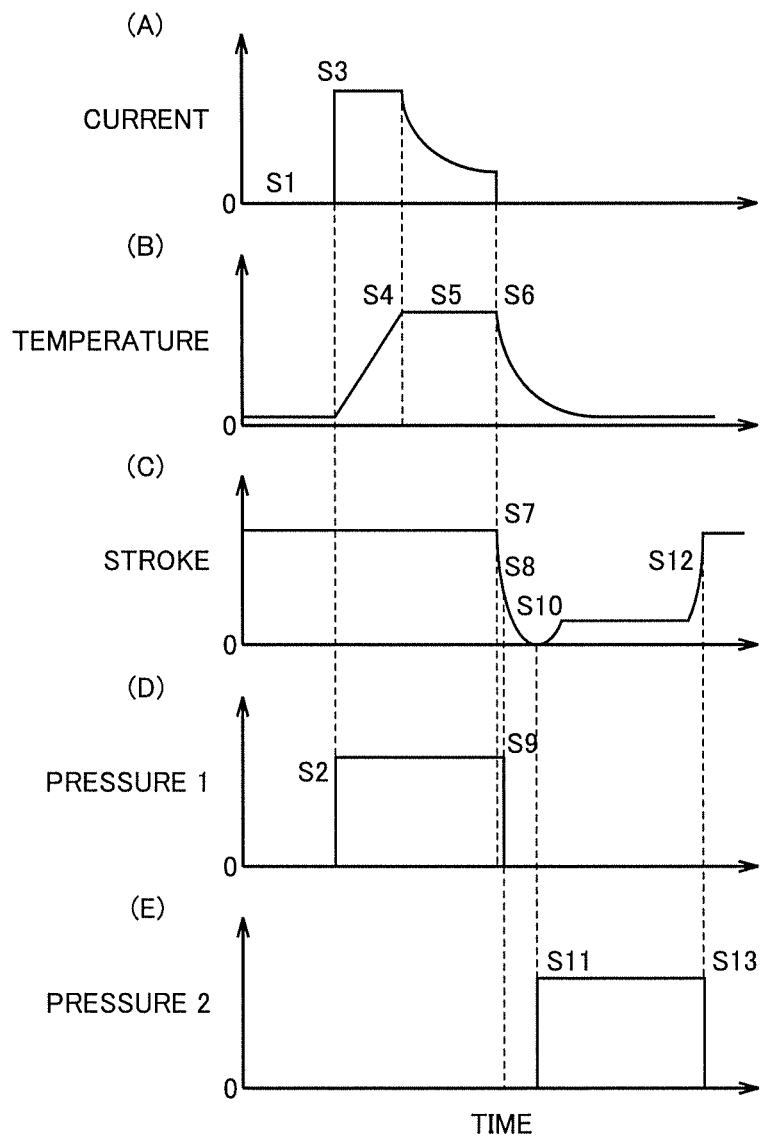
FIG. 3 is a diagram showing (A) change over time in current supplied to a steel material, (B) change over time in temperature of the steel material, (C) a stroke of a press machine, and (D) and (E) an operation of a hydraulic chuck in the method of manufacturing a rolling bearing ring according to the first embodiment of the present invention.

A method of manufacturing a rolling bearing ring according to the present first embodiment will now be described. FIG. 2 is a flowchart schematically showing the method of manufacturing a rolling bearing ring according to the present embodiment. FIG. 3 shows (A) change over time in current supplied to a steel material, (B) change over time in temperature of the steel material, (C) a stroke of a press machine, and (D) and (E) an operation of a hydraulic chuck in the method of manufacturing a rolling bearing ring according to the present embodiment. The method of manufacturing a rolling bearing ring according to the present embodiment will be described below in the order of "S0 to S13" provided in FIGS. 2 and 3 mainly with reference to the flowchart in FIG. 2 and a time chart in FIG. 3.

Figure 4:
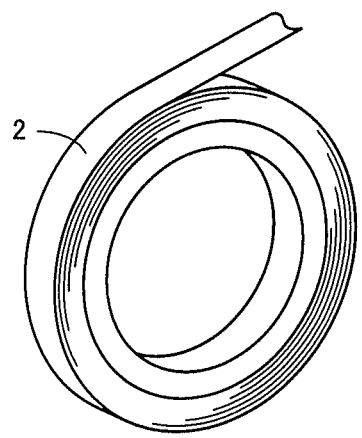
FIG. 4 is a schematic perspective view showing a coil material used in the method of manufacturing a rolling bearing ring according to the first embodiment of the present invention.

Initially, a steel material which is a material for obtaining rolling bearing ring 11 is prepared (S0). Specifically, referring to FIG. 4, a coil material 2 as a steel material is prepared. As shown in FIG. 4, coil material 2 is obtained by winding up like a coil, a rolled steel material in a form of a thin plate.

Coil material 2 is composed of steel containing, for example, at least 0.4 mass % of carbon. More specifically, coil material 2 is composed of steel such as SAE1070 defined under SAE standards, S40C and S45C defined under JIS as carbon steel for machine structural use, SUJ2 defined under JIS as high carbon chromium bearing steel, SK95 defined under JIS as carbon tool steel, SCM440 defined under JIS as low-alloyed steel for machine structural use, SKS11 defined under JIS as an alloy tool steel, SUP13 defined under JIS as a spring steel, or SUS440 defined under JIS as stainless steel. Coil material 2 is a steel material in a form of a thin plate having a thickness not greater than 2 mm.

Figure 5:
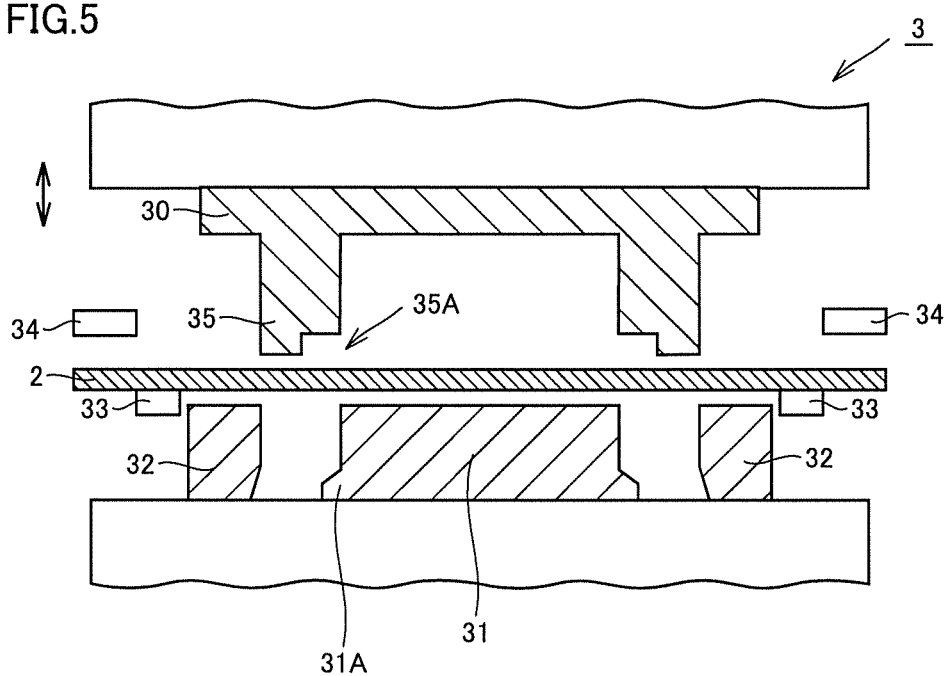
FIG. 5 is a schematic cross-sectional view showing a state that a steel material is set on a press machine in the method of manufacturing a rolling bearing ring according to the first embodiment of the present invention.

Then, a press machine 3 as a forming table for obtaining rolling bearing ring 11 from coil material 2 is prepared (S0). A construction of press machine 3 will initially be described with reference to FIG. 5. FIG. 5 shows a cross-section along a vertical direction (a direction shown with a double-headed arrow in the figure) of press machine 3. Press machine 3 mainly has a press die 30, forming dies 31 and 32, a support base 33, and a power feed terminal 34.

Press die 30 has a cylindrical pressing portion 35. Pressing portion 35 is a portion for punching coil material 2 by being brought in contact with coil material 2. A recess portion 35A having a tip end portion cut is provided in pressing portion 35. Press die 30 is arranged to face forming dies 31 and 32 in the vertical direction. Press die 30 can be caused to make a stroke toward forming dies 31 and 32 or to move away from forming dies 31 and 32 by a not-shown drive mechanism.

Figure 10:
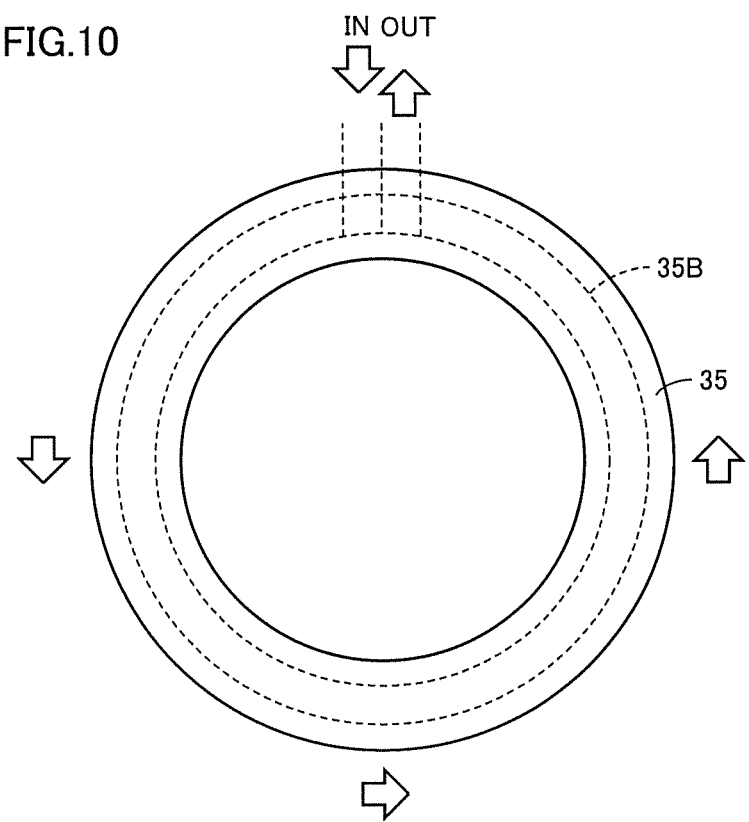
FIG. 10 is a schematic plan view showing a water cooling circuit provided in the press machine used in the method of manufacturing a rolling bearing ring according to the first embodiment of the present invention.

FIG. 10 shows pressing portion 35 in a plan view As shown with a dashed line in FIG. 10, a water cooling circuit 35B serving as a passage for cooling water is provided in pressing portion 35 along the circumferential direction. FIG. 10 shows an arrow showing a flow of cooling water. By thus cooling pressing portion 35 by circulating cooling water, coil material 2 can rapidly be cooled (die quenched) when pressing portion 35 is brought in contact with coil material 2.

Figure 7:
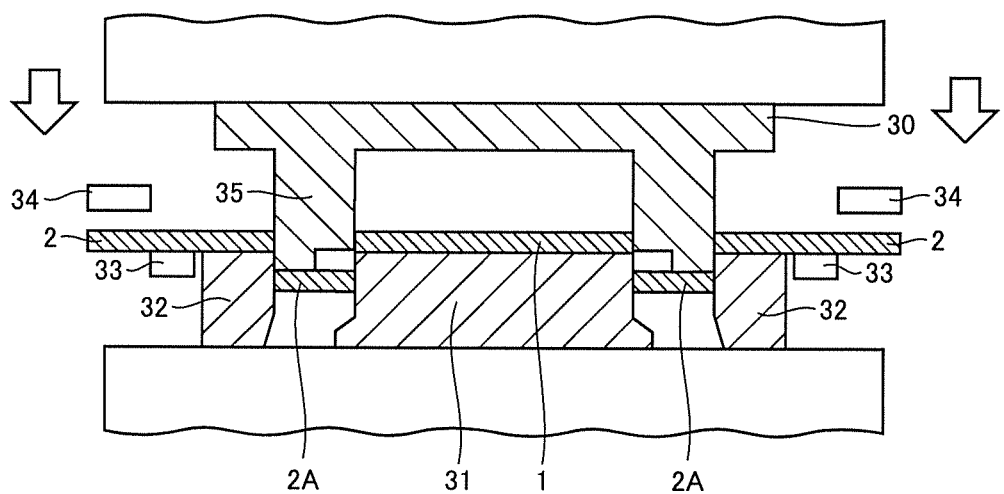
FIG. 7 is a schematic cross-sectional view showing a state that the steel material is punched by the press machine in the method of manufacturing a rolling bearing ring according to the first embodiment of the present invention.

Referring to FIG. 5, forming dies 31 and 32 are arranged to face press die 30 in the vertical direction. As shown in FIG. 5, forming die 31 has a columnar shape and a projection portion 31A projecting radially outward is formed in an outer circumferential portion thereof. Forming die 32 is in a ring form greater in diameter than forming die 31. Forming die 32 is arranged outside forming die 31 such that a gap is provided between forming dies 31 and 32 in the radial direction. As shown in FIG. 7, when press die 30 makes a stroke toward forming dies 31 and 32, pressing portion 35 is located in the gap between forming dies 31 and 32.

Referring to FIG. 5, support base 33 serves for setting of coil material 2. Power feed terminal 34 serves for supply of a current to coil material 2. More specifically, power feed terminal 34 is connected to a DC power supply or an AC power supply which is not shown and supplies a direct current or an alternating current to coil material 2. Coil material 2 can be heated by heat generation resulting from supply of the current. Press machine 3 constructed as above is prepared.

Then, coil material 2 is set on press machine 3 (S1). Specifically, referring to FIG. 5, coil material 2 is set on support base 33 of press machine 3. Then, coil material 2 is clamped by a not-shown hydraulic chuck (S2, clamp at pressure 1).

Figure 6:
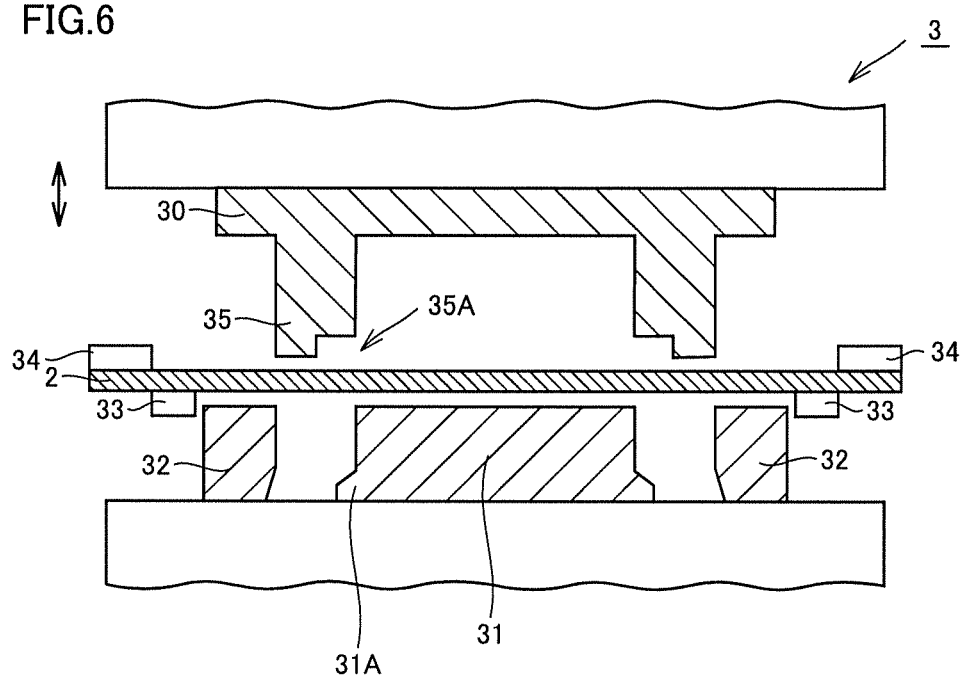
FIG. 6 is a schematic cross-sectional view showing a state that a current is supplied from a power feed terminal to the steel material in the method of manufacturing a rolling bearing ring according to the first embodiment of the present invention.

Then, electrical heating is started (S3). Specifically, referring to FIG. 6, initially, power feed terminal 34 is brought in contact with coil material 2. Then, a current is supplied to coil material 2 through power feed terminal 34. Thus, coil material 2 is heated by heat generation (Joule heat) resulting from supply of a current (electrical heating). Then, after a temperature of coil material 2 reached a target temperature (S4), coil material 2 is held for a certain period of time at the target temperature (S5). Thus, electrical heating of coil material 2 on press machine 3 is completed (S6).

A heating temperature (target temperature) of coil material 2 is a temperature not lower than an $A_1$ transformation point of steel which makes up coil material 2, and it is, for example, 1000° C. The "$A_1$ transformation point" refers to a point corresponding to a temperature at which a structure of steel starts transformation from ferrite to austenite when steel is heated. Therefore, the structure of steel which makes up coil material 2 transforms to austenite as a result of electrical heating.

At least any method selected from the group consisting of electrical heating, induction heating, contact heat transfer, and far-infrared heating can be adopted as the method of heating coil material 2. Each heating method will be described below in further detail.

Figure 11:
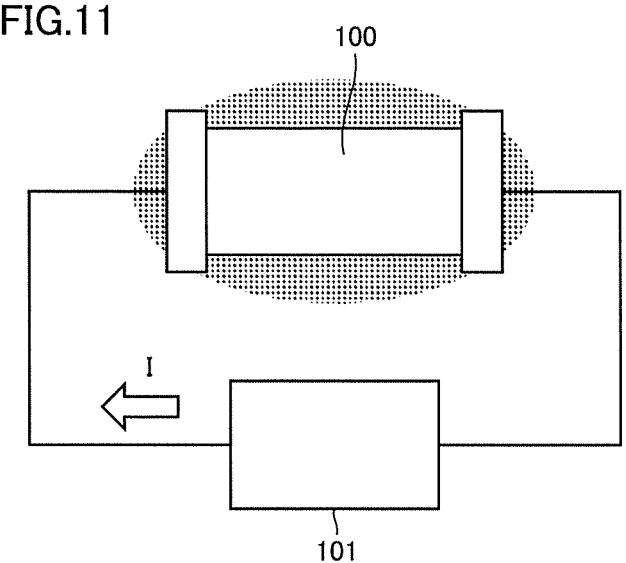
FIG. 11 is a schematic diagram for illustrating a heating method using electrical heating.

Referring to FIG. 11, in electrical heating, a current I is supplied from a power supply 101 to a heated object 100 having a resistance R. Thus, heat generation ($P=RI^2$) owing to supply of current I occurs in heated object 100 and heated object 100 is heated. In the present embodiment, coil material 2 may be heated by heat generation resulting from supply of a direct current from power feed terminal 34 to coil material 2. Coil material 2 may be heated by heat generation resulting from supply of an alternating current from power feed terminal 34 to coil material 2.

Figure 12:
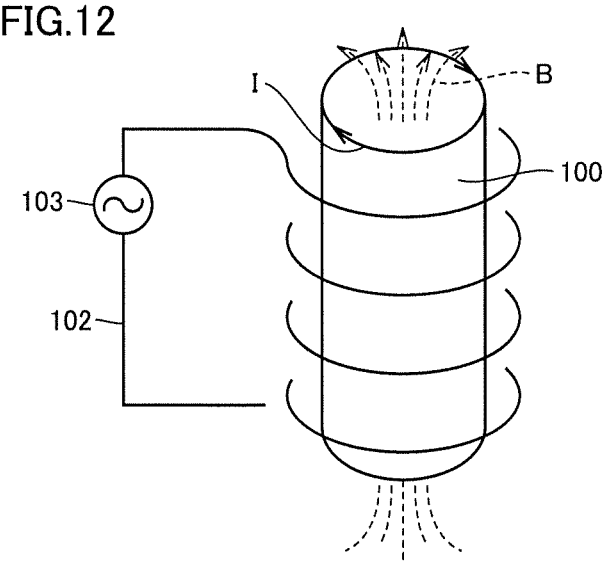
FIG. 12 is a schematic diagram for illustrating a heating method using induction heating.

Referring to FIG. 12, in induction heating, an alternating current is supplied from an AC power supply 103 to a coil 102 so that an alternating magnetic flux B is produced in heated object 100. An eddy current I is produced in heated object 100 in a direction cancelling alternating magnetic flux B. Then, heated object 100 is heated by heat generation resulting from eddy current I and resistance R of heated object 100.

Figure 13:
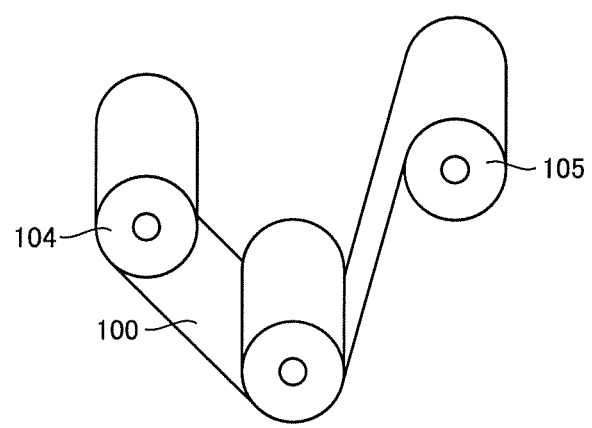
FIG. 13 is a schematic diagram for illustrating a heating method using contact heat transfer.

Referring to FIG. 13, in contact heat transfer, heated object 100 is heated by heat transfer from an internal heating roll 104 and an external heating roll 105. In far-infrared heating, far-infrared energy is provided to a heated object by irradiating the heated object with far-infrared rays. Heat generation results from activation of vibration between atoms which make up the heated object and the heated object is thus heated.

Then, press-forming of coil material 2 is started (S7). Specifically, referring to FIG. 7, press die 30 makes a stroke toward forming dies 31 and 32. Thus, as shown in FIG. 7, pressing portion 35 is in contact with coil material 2 and a part of coil material 2 is punched into a ring form in a direction of thickness of coil material 2 (S8). A formed object 2A in a ring form is thus obtained. After punching is completed, pressure 1 is released (S9).

Figure 8:
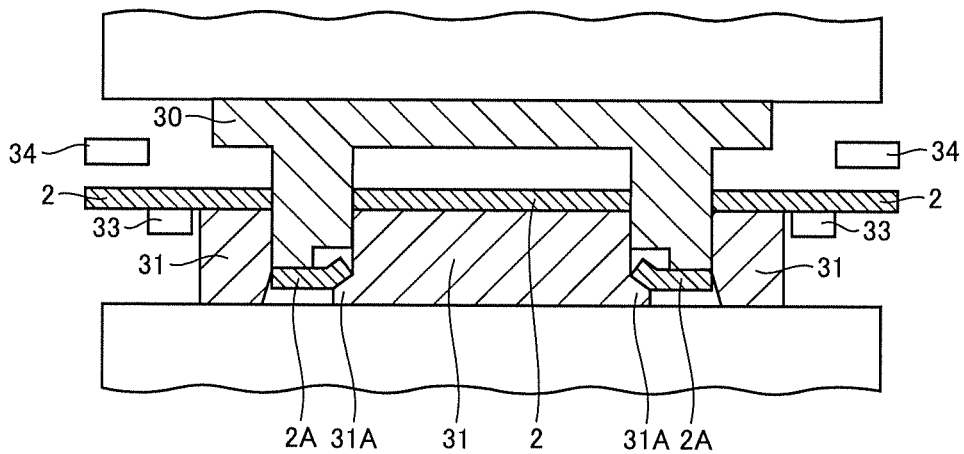
FIG. 8 is a schematic cross-sectional view showing a state that the steel material punched into a ring form is formed in the method of manufacturing a rolling bearing ring according to the first embodiment of the present invention.

Then, referring to FIG. 8, as press die 30 makes a further stroke toward forming dies 31 and 32, an inner circumferential portion of formed object 2A is in contact with projection portion 31A of forming die 31. As press die 30 makes a stroke in this state, the press die reaches a bottom dead center (S10). Thus, referring to FIG. 9, the inner circumferential portion of formed object 2A is bent to be oriented in the direction of thickness of formed object 2A. Formed object 2A is thus formed in press machine 3.

Figure 9:
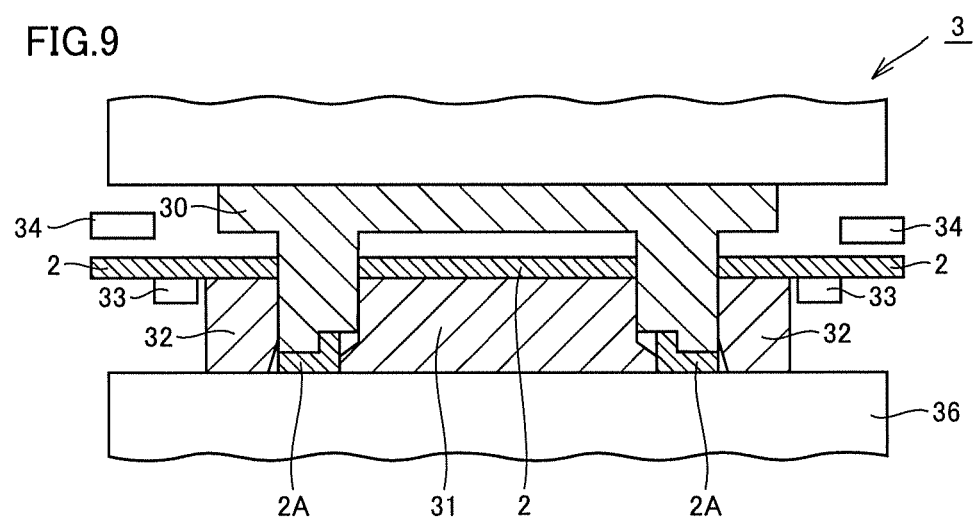
FIG. 9 is a schematic cross-sectional view showing a state that the steel material punched into the ring form is quenched in the method of manufacturing a rolling bearing ring according to the first embodiment of the present invention.
Figure 14:
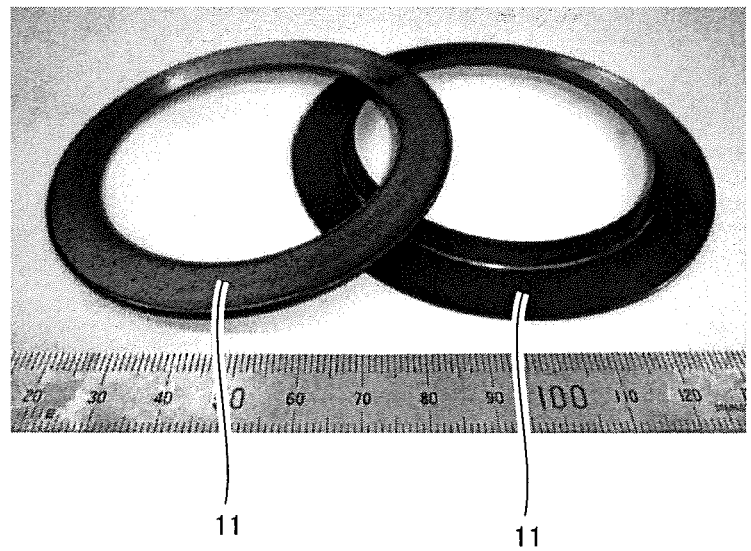
FIG. 14 shows a photograph of a rolling bearing ring manufactured with the method of manufacturing a rolling bearing ring according to the first embodiment of the present invention.

Then, referring to FIG. 9, formed object 2A is clamped by a not-shown hydraulic chuck (S11, clamp at pressure 2). Then, as shown in FIG. 9, formed object 2A is held for a certain period of time while it is in contact with press machine 3 (press die 30, forming die 31, and a base portion 36). Here, cooling water is supplied to water cooling circuit 35B in press die 30 as above (FIG. 10). Thus, as formed object 2A is rapidly cooled to a temperature not higher than an $M_s$ point, the formed object is quenched. The "$M_s$ point (martensite transformation point)" refers to a point corresponding to a temperature at which conversion to martensite is started when steel which was converted to austenite is cooled. Consequently, the structure of steel which makes up formed object 2A transforms into martensite. Quenching of formed object 2A (die quenching) is thus completed (S12). Finally, pressure 2 is released (S13) and formed object 2A of which quenching is completed is taken out of press machine 3. Through the process as above, rolling bearing ring 11 as shown in a photograph in FIG. 14 is manufactured and the method of manufacturing a rolling bearing ring according to the present embodiment is completed.

Figure 17:
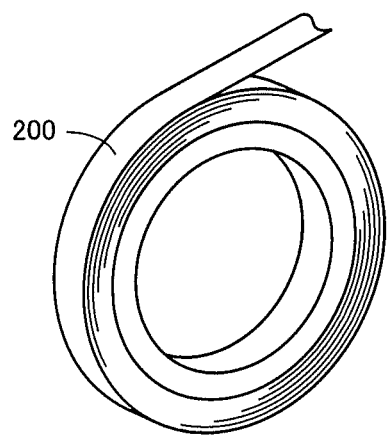
FIG. 17 is a schematic diagram for illustrating a method of manufacturing a rolling bearing ring in a comparative example.
Figure 18:
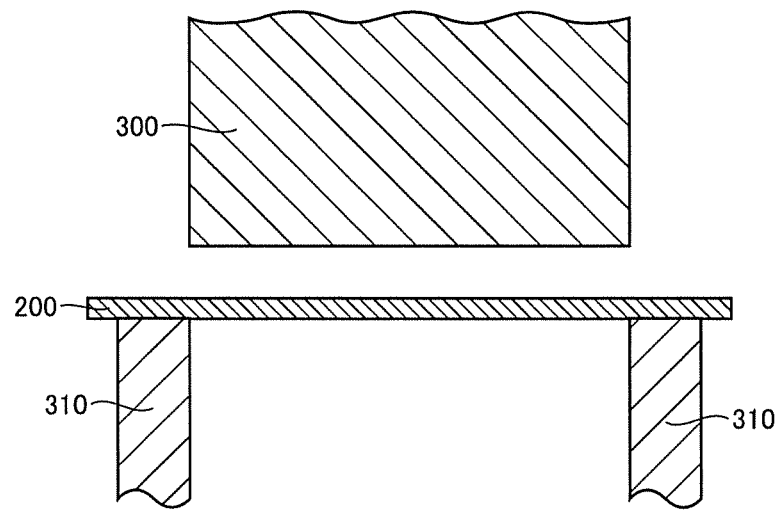
FIG. 18 is a schematic diagram for illustrating the method of manufacturing a rolling bearing ring in the comparative example.
Figure 19:
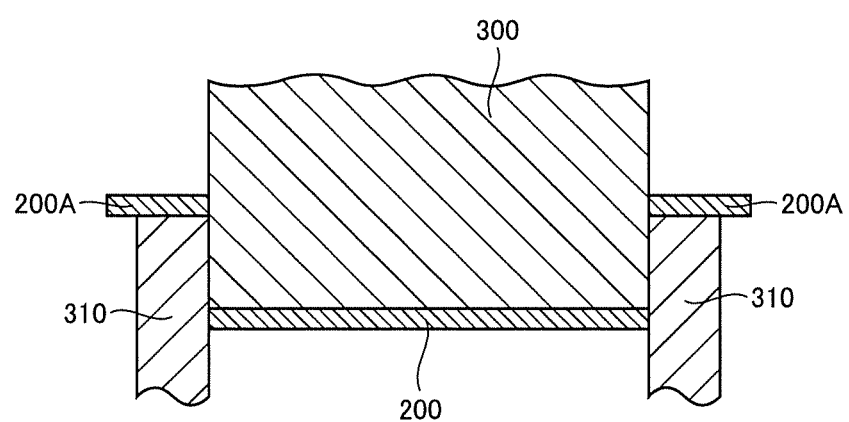
FIG. 19 is a schematic diagram for illustrating the method of manufacturing a rolling bearing ring in the comparative example.
Figure 20:
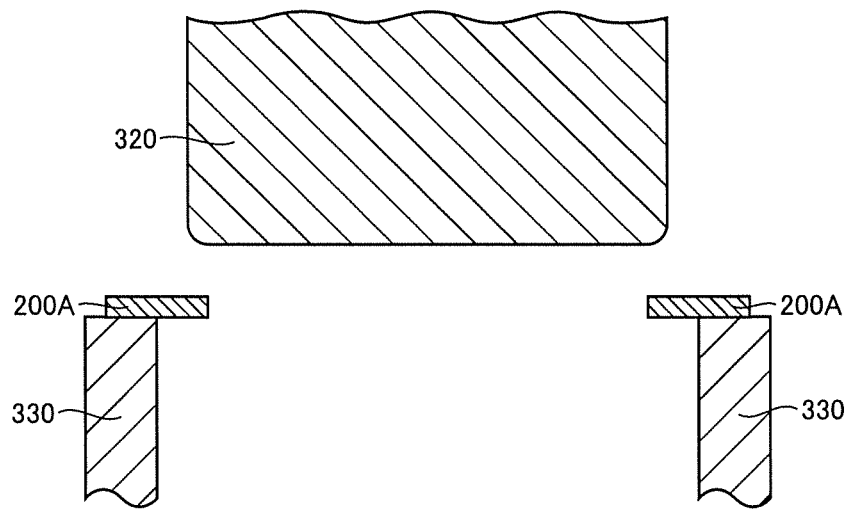
FIG. 20 is a schematic diagram for illustrating the method of manufacturing a rolling bearing ring in the comparative example.
Figure 21:
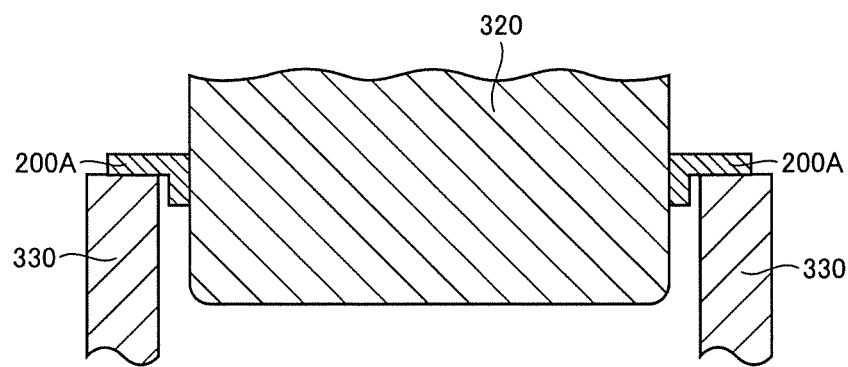
FIG. 21 is a schematic diagram for illustrating the method of manufacturing a rolling bearing ring in the comparative example.

A function and effect of the method of manufacturing a rolling bearing ring according to the present embodiment will now be described with reference to a comparative example. A method of manufacturing a rolling bearing ring in the comparative example will initially be described with reference to FIGS. 17 to 25. Referring to FIG. 17, initially, a coil material 200 obtained by winding up like a coil, a rolled steel material in a form of a thin plate is prepared. Then, referring to FIGS. 18 and 19, coil material 200 is set on a die 310 and a die 300 makes a stroke toward die 310. Coil material 200 is thus punched. A formed object 200A in a ring form is thus obtained. Then, referring to FIGS. 20 and 21, formed object 200A is set on a die 330 and a die 320 makes a stroke toward die 330, so that an inner circumferential portion of formed object 200A is formed.

Figure 22:
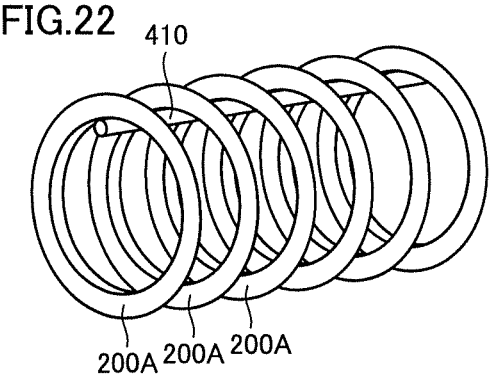
FIG. 22 is a schematic diagram for illustrating the method of manufacturing a rolling bearing ring in the comparative example.
Figure 23:
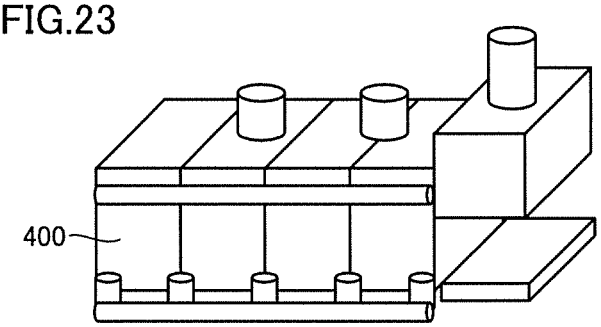
FIG. 23 is a schematic diagram for illustrating the method of manufacturing a rolling bearing ring in the comparative example.
Figure 24:
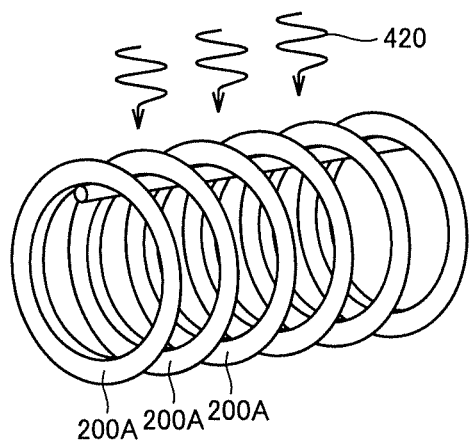
FIG. 24 is a schematic diagram for illustrating the method of manufacturing a rolling bearing ring in the comparative example.
Figure 25:
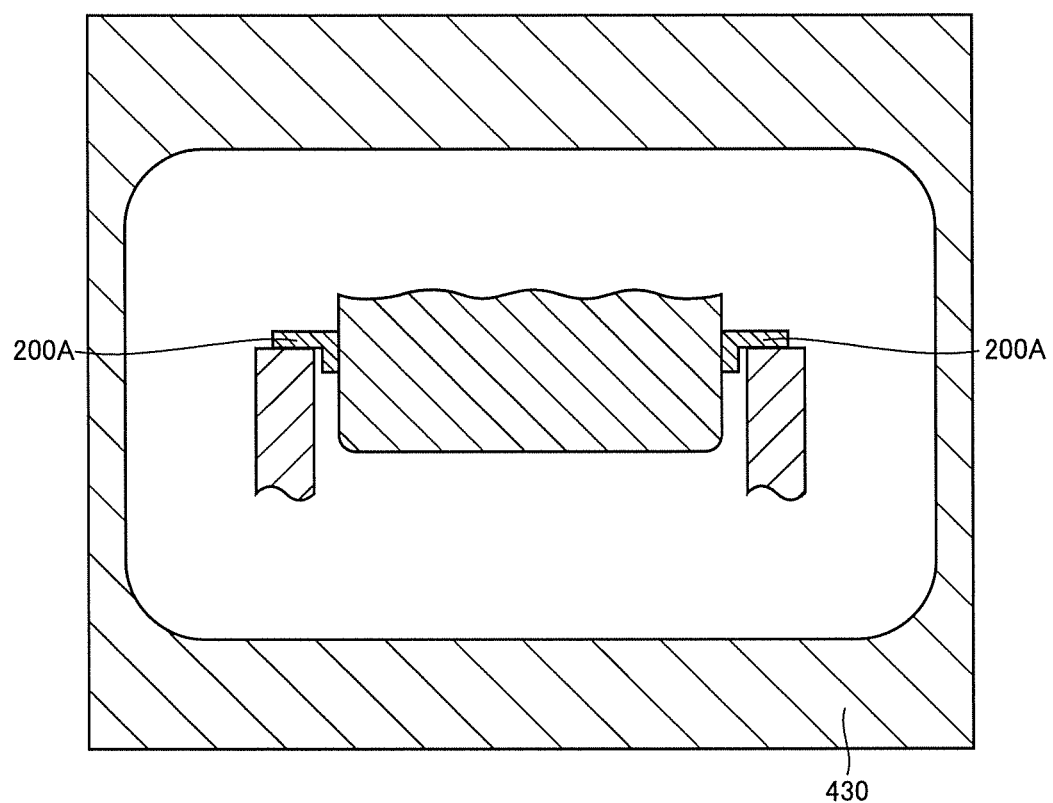
FIG. 25 is a schematic diagram for illustrating the method of manufacturing a rolling bearing ring in the comparative example.

Then, referring to FIG. 22, in a setup step before heat treatment, a plurality of formed objects 200A are aligned as being hung over a bar 410. Thereafter, referring to FIGS. 22 and 23, these formed objects 200A are placed in a carburization furnace 400 for carburization of formed objects 200A. Then, referring to FIG. 24, carburized formed objects 200A are cooled by supplying air blast 420 so that formed objects 200A are quenched. Finally, referring to FIG. 25, quenched formed object 200A is press-tempered in a tempering furnace 430. Since the method of manufacturing a rolling bearing ring in the comparative example includes many steps as above, cost for manufacturing a rolling bearing ring is high.

In the method of manufacturing a rolling bearing ring according to the present embodiment, steps of heating, punching, forming, and quenching coil material 2 are all performed as one step on press machine 3. Therefore, the manufacturing process can be shorter than in the method of manufacturing a rolling bearing ring in the comparative example in which the steps are separately performed. Consequently, cost for manufacturing a rolling bearing ring can further be reduced and a more inexpensive rolling bearing ring can be provided.

Figure 15:
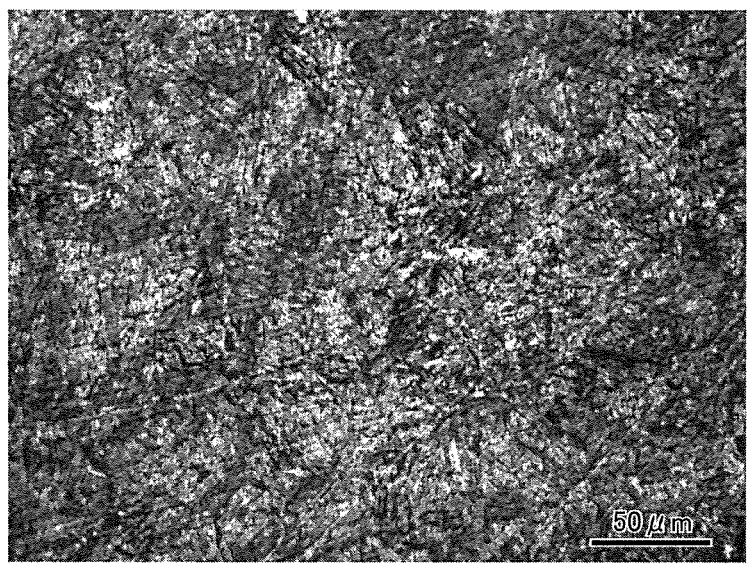
FIG. 15 shows a photograph of a steel structure in the rolling bearing ring manufactured with the method of manufacturing a rolling bearing ring according to the first embodiment of the present invention.

A Vickers hardness of rolling bearing ring 11 (steel material: SAE1070) manufactured with the method of manufacturing a rolling bearing ring according to the present embodiment is measured, and a hardness not lower than 700 HV is obtained. More specifically, a Vickers hardness of a plurality of rolling bearing rings 11 is measured and an average hardness is approximately 790 HV. A part of rolling bearing ring 11 is cut, a cross-section thereof is corroded with nital, and a microstructure in the cross-section is observed with an optical microscope. Then, a martensite structure as in a photograph in FIG. 15 is observed. Thus, in the method of manufacturing a rolling bearing ring according to the present embodiment, the manufacturing process is shortened and rolling bearing ring 11 having a high hardness as a result of sufficient quenching can be manufactured.

Second Embodiment

A second embodiment which is another embodiment of the present invention will now be described. A method of manufacturing a rolling bearing ring according to the second embodiment is performed basically similarly to the method of manufacturing a rolling bearing ring according to the first embodiment and achieves a similar effect. The second embodiment, however, is different from the first embodiment in that the outer circumferential portion (instead of the inner circumferential portion) of formed object 2A in the ring form is formed.

Figure 16:
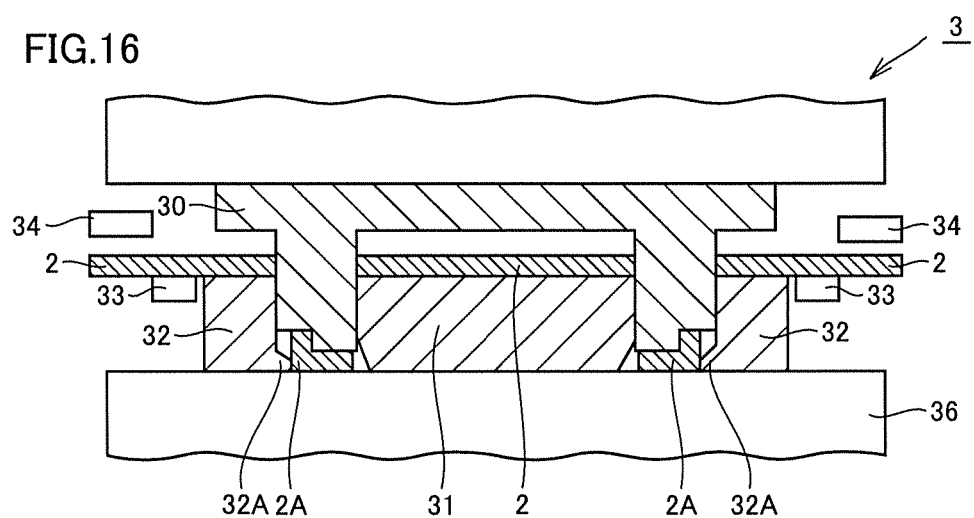
FIG. 16 is a schematic cross-sectional view for illustrating a method of manufacturing a rolling bearing ring according to a second embodiment.

Referring to FIG. 16, in the second embodiment, a projection portion 32A projecting radially inward is formed on an inner circumferential surface of forming die 32. Therefore, when press die 30 makes a stroke as in the first embodiment, the outer circumferential portion of formed object 2A in the ring form is in contact with projection portion 32A. Then, press die 30 makes a stroke until it reaches the bottom dead center as in the first embodiment. Thus, as shown in FIG. 16, the outer circumferential portion of formed object 2A is bent to be oriented in the direction of thickness of formed object 2A. Thus, as in the first embodiment, formed object 2A is formed in press machine 3 before quenching.

Though the method of manufacturing a rolling bearing ring according to the present invention is described in the embodiment above by way of example of a process for manufacturing a rolling bearing ring of thrust needle roller bearing 1, limitation thereto is not intended. The method of manufacturing a rolling bearing ring according to the present invention is similarly applicable also to manufacturing of a rolling bearing ring for a bearing of another type. When a rolling bearing ring for a thrust needle bearing is manufactured from a steel material in a form of a thin plate as in the embodiment above, punching is facilitated and a sufficiently quenched rolling bearing ring can be manufactured.

Third Embodiment

Figure 26:
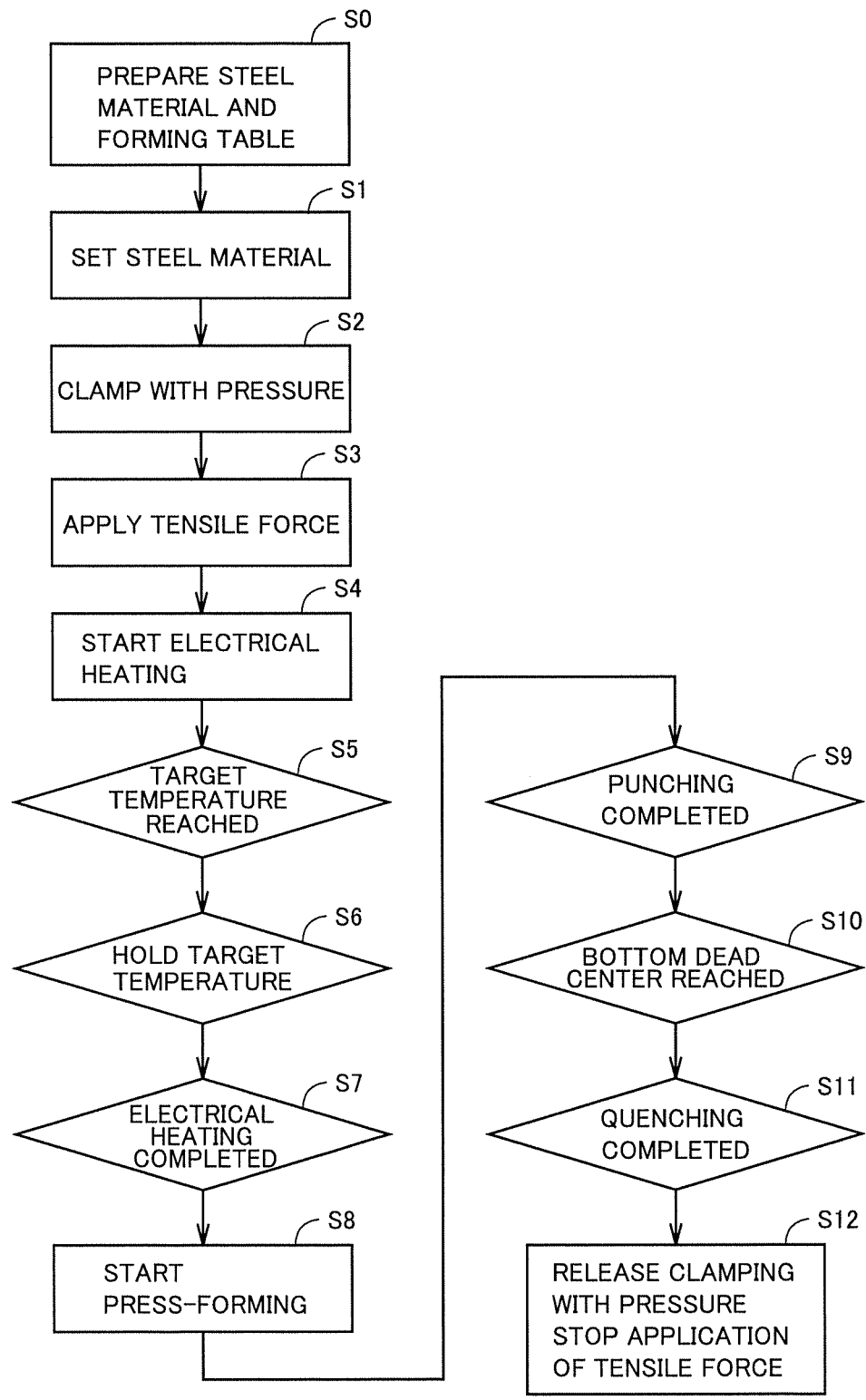
FIG. 26 is a flowchart schematically showing a method of manufacturing a rolling bearing ring according to a third embodiment of the present invention.
Figure 27:
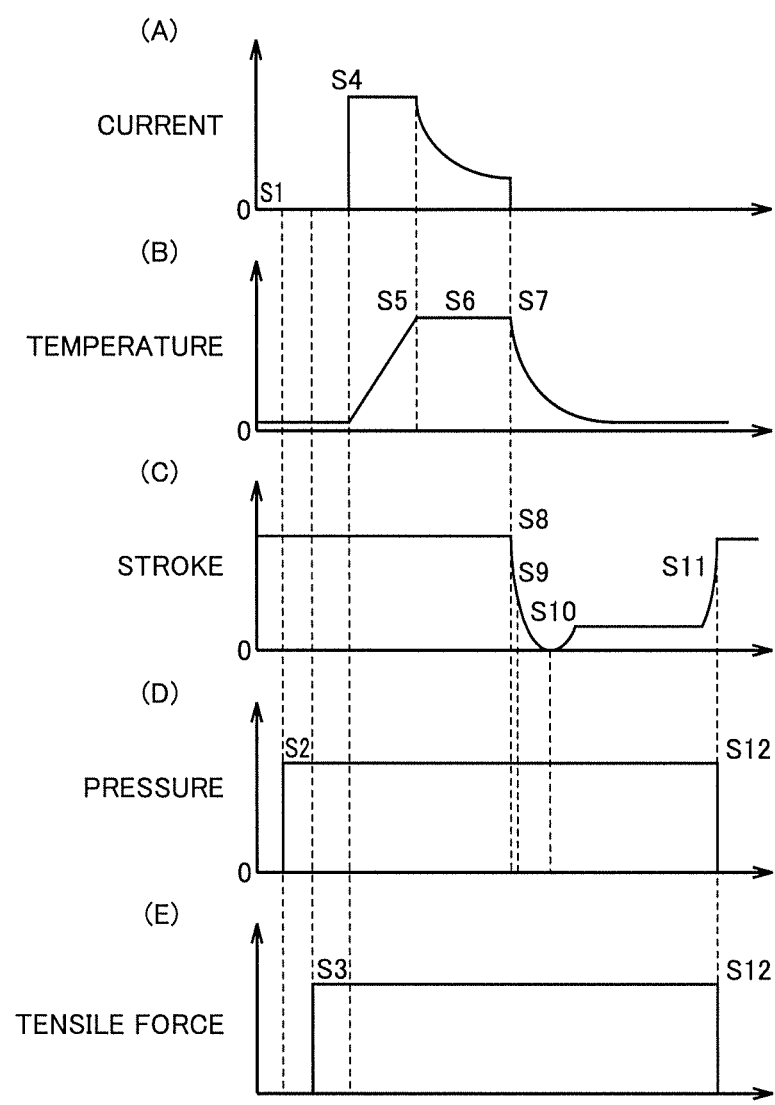
FIG. 27 is a diagram showing (A) change over time in current supplied to a steel material, (B) change over time in temperature of the steel material, (C) a stroke of a press machine, (D) an operation of a hydraulic chuck, and (E) operations of first and second clamping portions in the method of manufacturing a rolling bearing ring according to the third embodiment of the present invention.

A method of manufacturing a rolling bearing ring according to the present third embodiment will now be described. FIG. 26 is a flowchart schematically showing the method of manufacturing a rolling bearing ring according to the present third embodiment. FIG. 27 shows (A) change over time in current supplied to a steel material, (B) change over time in temperature of the steel material, (C) a stroke of a press machine, (D) an operation of a hydraulic chuck, and (E) operations of first and second clamping portions in the method of manufacturing a rolling bearing ring according to the present third embodiment. The method of manufacturing a rolling bearing ring according to the present third embodiment will be described below in the order of "S0 to S12" provided in FIGS. 26 and 27 mainly with reference to the flowchart in FIG. 26 and a time chart in FIG. 27.

Initially, a steel material which is a material for obtaining rolling bearing ring 11 is prepared (S0). Specifically, referring to FIG. 4, coil material 2 as a steel material is prepared. As shown in FIG. 4, coil material 2 is obtained by winding up like a coil, a rolled steel material in a form of a thin plate.

Coil material 2 is composed of steel containing, for example, at least 0.4 mass % of carbon. More specifically, coil material 2 is composed of steel such as SAE1070 defined under SAE standards, S40C and S45C defined under JIS as carbon steel for machine structural use, SUJ2 defined under JIS as high carbon chromium bearing steel, SK95 defined under JIS as carbon tool steel, SCM440 defined under JIS as low-alloyed steel for machine structural use, SKS11 defined under JIS as alloy tool steel, SUP13 defined under JIS as spring steel, or SUS440 defined under JIS as stainless steel. Coil material 2 is a steel material in a form of a thin plate having a thickness not greater than 2 mm.

Figure 28:
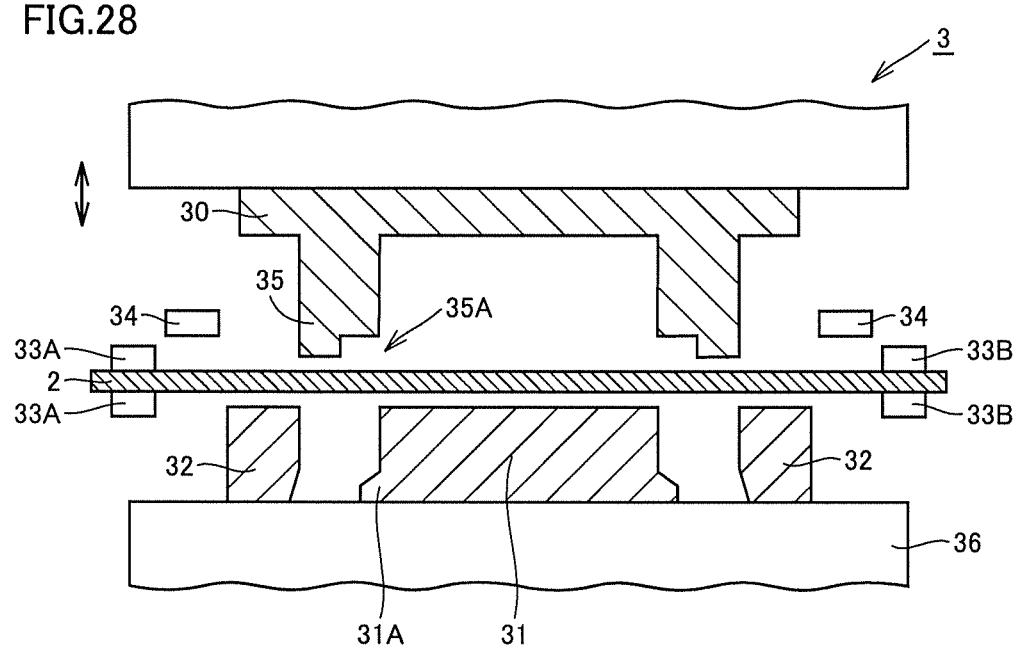
FIG. 28 is a schematic cross-sectional view showing a state that a steel material is set on the press machine in the method of manufacturing a rolling bearing ring according to the third embodiment of the present invention.

Then, press machine 3 as a forming table for obtaining rolling bearing ring 11 from coil material 2 is prepared (S0). A construction of press machine 3 will initially be described with reference to FIG. 28. FIG. 28 shows a cross-section along a vertical direction (a direction shown with a double-headed arrow in the figure) of press machine 3. Press machine 3 mainly has press die 30, forming dies 31 and 32, a first clamping portion 33A and a second clamping portion 33B, and power feed terminal 34.

Press die 30 has cylindrical pressing portion 35. Pressing portion 35 is a portion for punching coil material 2 by being brought in contact with coil material 2. Recess portion 35A having a tip end portion cut is provided in pressing portion 35. Press die 30 is arranged to face forming dies 31 and 32 in the vertical direction. Press die 30 can be caused to make a stroke toward forming dies 31 and 32 or to move away from forming dies 31 and 32 by a not-shown drive mechanism.

FIG. 10 shows pressing portion 35 in a plan view As shown with the dashed line in FIG. 10, water cooling circuit 35B serving as a passage for cooling water is provided along the circumferential direction in pressing portion 35. FIG. 10 shows the arrow showing a flow of cooling water. By thus cooling pressing portion 35 by circulating cooling water, coil material 2 can rapidly be cooled (die quenched) when pressing portion 35 is brought in contact with coil material 2.

Figure 30:
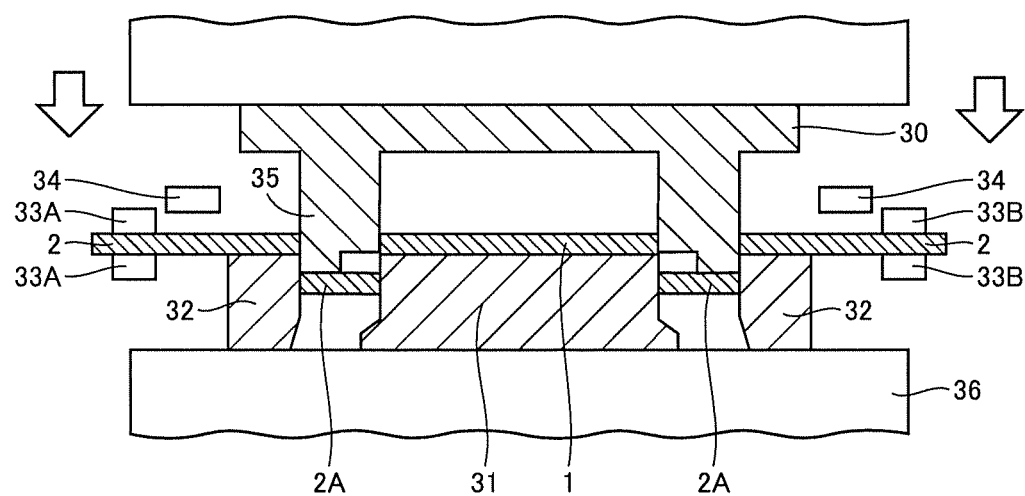
FIG. 30 is a schematic cross-sectional view showing a state that the steel material is punched by the press machine in the method of manufacturing a rolling bearing ring according to the third embodiment of the present invention.

Referring to FIG. 28, forming dies 31 and 32 are arranged to face press die 30 in the vertical direction. As shown in FIG. 28, forming die 31 has a columnar shape and projection portion 31A projecting radially outward is formed in the outer circumferential portion thereof. Forming die 32 is in a ring form greater in diameter than forming die 31. Forming die 32 is arranged outside forming die 31 such that a gap is provided between forming dies 31 and 32 in the radial direction. As shown in FIG. 30, when press die 30 makes a stroke toward forming dies 31 and 32, pressing portion 35 is located in the gap between forming dies 31 and 32.

First clamping portion 33A and second clamping portion 33B serve to fix coil material 2 on press machine 3 and to apply tensile force to coil material 2. First clamping portion 33A and second clamping portion 33B are provided to be able to switch between a state in which coil material 2 is sandwiched in the vertical direction and a state in which the steel material is not sandwiched. Though first clamping portion 33A and second clamping portion 33B may be in any construction, they may be provided, for example, as a hydraulic clamp or an air clamp.

First clamping portion 33A and second clamping portion 33B are provided at positions where they are opposed to each other with press die 30 and forming dies 31 and 32 being interposed in a direction of extension of coil material 2. First clamping portion 33A is arranged on a supply side of coil material 2 in the direction of extension and second clamping portion 33B is arranged on an ejection side of coil material 2 in the direction of extension.

First clamping portion 33A and second clamping portion 33B are provided to be relatively movable in the direction opposed to each other (the direction of extension of coil material 2). For example, first clamping portion 33A and second clamping portion 33B are each a hydraulic clamp including a hydraulic cylinder (not shown) and movably provided so as to move away from each other in the direction opposed to each other owing to the hydraulic cylinder. Thus, first clamping portion 33A and second clamping portion 33B can apply tensile force in the direction of extension of coil material 2 to coil material 2 arranged between press die 30 and forming dies 31 and 32. Tensile force which can be applied to coil material 2 by first clamping portion 33A and second clamping portion 33B is higher than 0 MPa and not higher than 500 MPa. Tensile force refers to stress in a direction of length of coil material 2 (stress for extending coil material 2, specifically, stress applied to coil material 2 for clamping coil material 2 for power feed and removing deformation due to thermal expansion).

Power feed terminal 34 serves for supply of a current to coil material 2. More specifically, power feed terminal 34 is connected to a DC power supply or an AC power supply which is not shown and supplies a direct current or an alternating current to coil material 2. Coil material 2 can be heated by heat generation resulting from supply of the current. Power feed terminal 34 is located, for example, on an inner side relative to first clamping portion 33A and second clamping portion 33B and provided to be able to be in contact with a portion of coil material 2 where tensile force is applied by first clamping portion 33A and second clamping portion 33B. Press machine 3 constructed as above is prepared.

Then, coil material 2 is set on press machine 3 (S1). Specifically, coil material 2 is clamped by first clamping portion 33A and second clamping portion 33B of press machine 3 (S2). A pressure for holding coil material 2 is supplied to first clamping portion 33A and second clamping portion 33B.

Then, tensile force is applied to coil material 2 (S3). Specifically, referring to FIG. 28, at least one of first clamping portion 33A and second clamping portion 33B is relatively moved so as to move away from the other thereof in the direction of extension of coil material 2. Thus, in coil material 2, tensile force in accordance with an amount of relative movement of first clamping portion 33A and second clamping portion 33B (an amount of change in distance between first clamping portion 33A and second clamping portion 33B) is applied to a region located between respective portions held by first clamping portion 33A and second clamping portion 33B. Tensile force applied to coil material 2 is, for example, higher than 0 MPa and not higher than 500 MPa. Relative positional relation between first clamping portion 33A and second clamping portion 33B is held at least until press-forming ends (S9). Tensile force applied to coil material 2 is held at least during a period in which heating and press-forming are performed.

Figure 29:
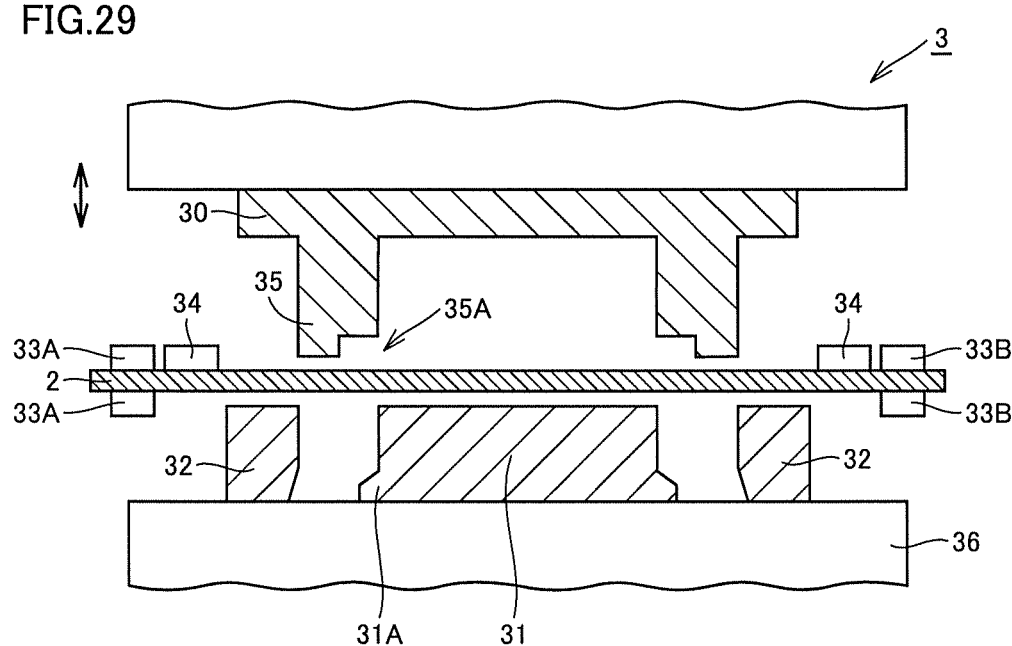
FIG. 29 is a schematic cross-sectional view showing a state that a current is supplied from a power feed terminal to the steel material in the method of manufacturing a rolling bearing ring according to the third embodiment of the present invention.

Then, electrical heating is started (S4). Specifically, referring to FIG. 29, initially, power feed terminal 34 is brought in contact with coil material 2. Then, a current is supplied to coil material 2 through power feed terminal 34. Thus, coil material 2 is heated by heat generation (Joule heat) resulting from supply of a current (electrical heating). Then, after a temperature of coil material 2 reached a target temperature (S5), coil material 2 is held for a certain period of time at the target temperature (S6). Thus, electrical heating of coil material 2 on press machine 3 is completed (S7).

A heating temperature (target temperature) of coil material 2 is a temperature not lower than an $A_1$ transformation point of steel forming coil material 2, and it is, for example, 1000° C. The "$A_1$ transformation point" refers to a point corresponding to a temperature at which a structure of steel starts transformation from ferrite to austenite when steel is heated. Therefore, the structure of steel which makes up coil material 2 transforms to austenite as a result of electrical heating.

Then, press-forming of coil material 2 is started (S8). Specifically, referring to FIG. 30, press die 30 makes a stroke toward forming dies 31 and 32. Thus, as shown in FIG. 30, pressing portion 35 is in contact with coil material 2 and a part of coil material 2 is punched into a ring form in the direction of thickness of coil material 2 (S9). Formed object 2A in the ring form is thus obtained.

Figure 31:
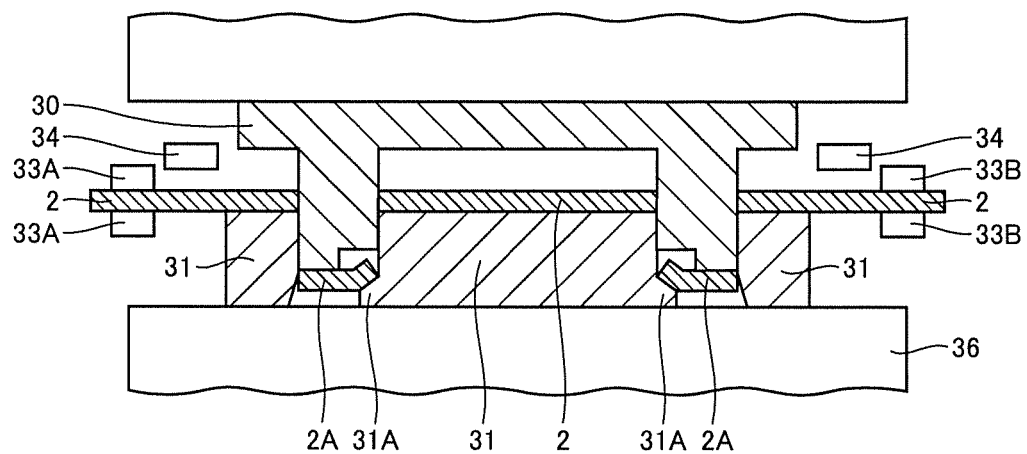
FIG. 31 is a schematic cross-sectional view showing a state that the steel material punched into a ring form is formed in the method of manufacturing a rolling bearing ring according to the third embodiment of the present invention.

Then, referring to FIG. 31, as press die 30 makes a further stroke toward forming dies 31 and 32, an inner circumferential portion of formed object 2A is in contact with projection portion 31A of forming die 31. As press die 30 makes a stroke in this state, the press die reaches the bottom dead center (S10). Thus, referring to FIG. 32, the inner circumferential portion of formed object 2A is bent to be oriented in the direction of thickness of formed object 2A. Formed object 2A is thus formed in press machine 3.

Figure 32:
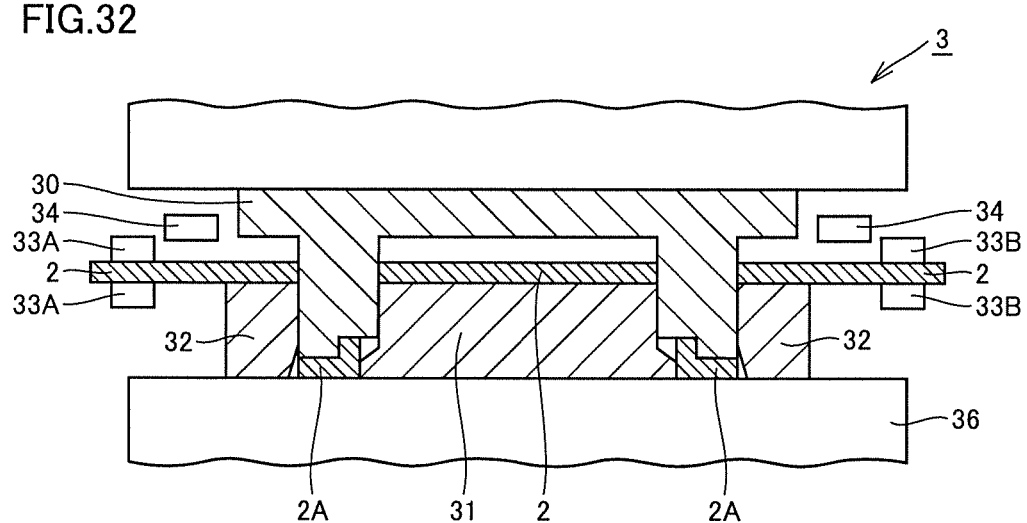
FIG. 32 is a schematic cross-sectional view showing a state that the steel material punched into the ring form is quenched in the method of manufacturing a rolling bearing ring according to the third embodiment of the present invention.

Then, referring to FIG. 32, formed object 2A is held for a certain period of time while it is in contact with press machine 3 (press die 30, forming die 31, and base portion 36). Here, cooling water is supplied to water cooling circuit 35B in press die 30 as above (FIG. 10). Thus, as formed object 2A is rapidly cooled to a temperature not higher than an $M_s$ point, the formed object is quenched. The "$M_s$ point (martensite transformation point)" refers to a point corresponding to a temperature at which conversion to martensite is started when steel which was converted to austenite is cooled. Consequently, the structure of steel which makes up formed object 2A transforms into martensite. Quenching of formed object 2A (die quenching) is thus completed (S11). Finally, a pressure supplied to first clamping portion 33A and second clamping portion 33B for holding coil material 2 is released (S12) and coil material 2 which is a refuse material and formed object 2A of which quenching has been completed are taken out of press machine 3. Tensile force applied to coil material 2 is relaxed (S12) by relaxing clamping force between first clamping portion 33A and second clamping portion 33B. Through the process as above, rolling bearing ring 11 is manufactured and the method of manufacturing a rolling bearing ring according to the present third embodiment is completed.

The method of manufacturing a rolling bearing ring according to the present third embodiment is not limited as above.

A method of applying tensile force to coil material 2 is not limited to a method of using first clamping portion 33A and second clamping portion 33B provided in press machine 3. For example, a method of using first clamping portion 33A and second clamping portion 33B provided outside press machine 3 may be applied. In other words, first clamping portion 33A and second clamping portion 33B may both be provided outside press machine 3.

Figure 33:
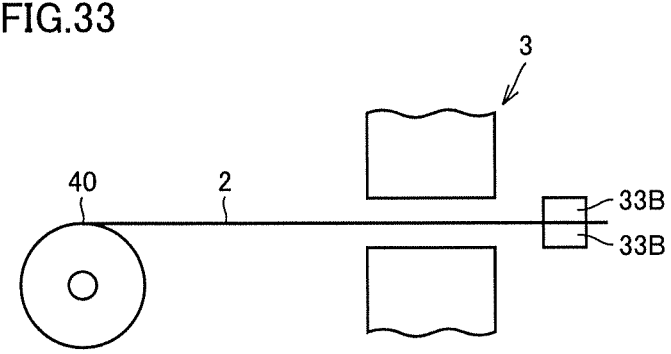
FIG. 33 is a schematic diagram for illustrating a method of applying tensile force to the steel material by using a portion for supplying the steel material.
Figure 34:
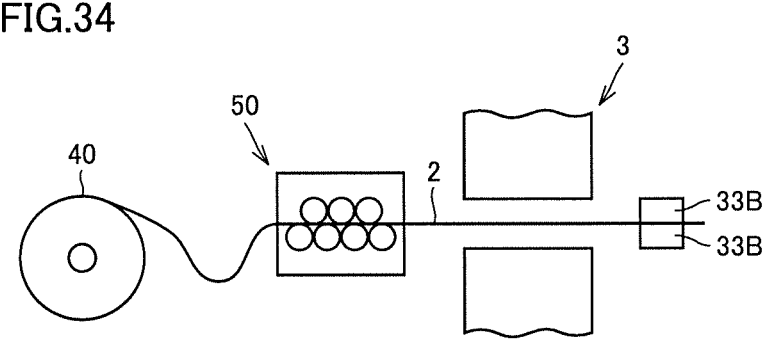
FIG. 34 is a schematic diagram for illustrating a method of applying tensile force to the steel material by using a portion for correcting the steel material.

Instead of first clamping portion 33A in FIG. 28, a supply portion 40 (an uncoiler) provided to be able to supply coil material 2 to press machine 3 may be employed as shown in FIG. 33, or a correction portion 50 (a leveler) provided to be able to correct distortion of coil material 2 supplied from supply portion 40 to press machine 3 may be employed as shown in FIG. 34. By doing so as well, tensile force can be applied to steel material 2 located between such a component and second clamping portion 33B by driving at least one of such a component and second clamping portion 33B.

For example, by having supply portion 40 perform a rewinding operation, tensile force can be applied across two points in the direction of extension of coil material 2 held by supply portion 40 and second clamping portion 33B. Alternatively, tensile force can be applied across two points in the direction of extension of coil material 2 held by correction portion 50 and second clamping portion 33B, for example, by moving second clamping portion 33B away from correction portion 50 in the direction of extension of coil material 2.

At least any method selected from the group consisting of indirect resistance heating, induction heating, contact heat transfer, and far-infrared heating can be adopted as the method of heating coil material 2, without being limited to electrical heating. Each heating method will be described below in further detail.

Figure 35:
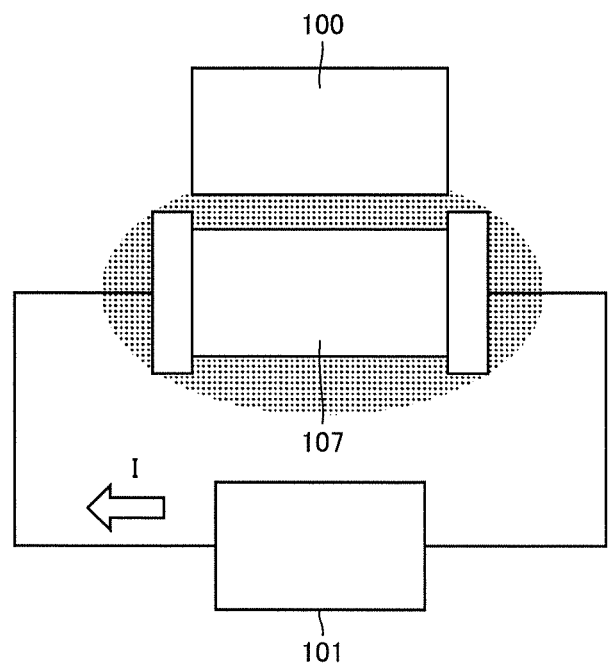
FIG. 35 is a schematic diagram illustrating a heating method using electrical heating.

Referring to FIG. 35, resistance heating includes a method of heating heated object 100 with Joule heat generated as a result of direct power feed to heated object 100 having a resistance $R_1$ and a method of indirectly heating heated object 100 arranged around a heat generator 107 having a resistance $R_2$ with Joule heat generated as a result of power feed to heat generator 107.

Referring to FIG. 35, in the method of indirectly heating heated object 100, current I is supplied from power supply 101 to heat generator 107 having resistance $R_2$. Thus, heat generation ($P=R_2I^2$) resulting from supply of current I occurs in heat generator 107 and heat generator 107 generates heat. In the present third embodiment, a direct current or an alternating current may be supplied to heat generator 107.

In press machine 3, first clamping portion 33A and second clamping portion 33B may be provided at positions where they are opposed to each other with press die 30 and forming dies 31 and 32 being interposed in a direction along the surface of coil material 2 and perpendicular to the direction of extension (a direction of width).

Figure 36:
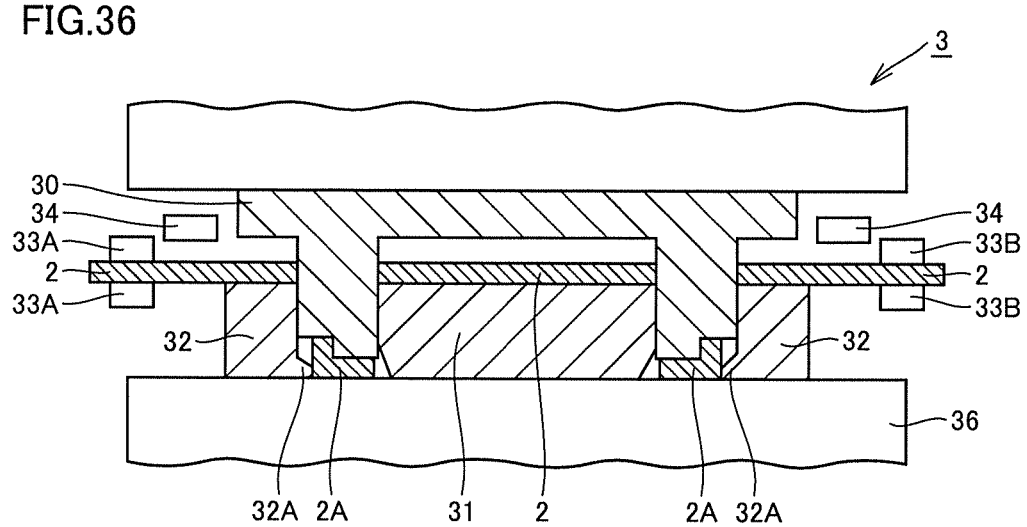
FIG. 36 is a schematic cross-sectional view for illustrating a modification of the method of manufacturing a rolling bearing ring according to the third embodiment of the present invention.

In the method of manufacturing a rolling bearing ring according to the present third embodiment, as shown in FIG. 32, though the inner circumferential portion of formed object 2A is bent to be oriented in the direction of thickness of formed object 2A so that formed object 2A is formed in press machine 3, limitation thereto is not intended. Referring to FIG. 36, the outer circumferential portion (instead of the inner circumferential portion) of formed object 2A in the ring form may be formed. In this case, projection portion 32A projecting radially inward is formed on the inner circumferential surface of forming die 32. Therefore, when press die 30 makes a stroke as in the third embodiment, the outer circumferential portion of formed object 2A in the ring form is in contact with projection portion 32A. Then, press die 30 makes a stroke until it reaches the bottom dead center as in the third embodiment. Thus, as shown in FIG. 36, the outer circumferential portion of formed object 2A is bent to be oriented in the direction of thickness of formed object 2A. By doing so as well, formed object 2A can be formed in press machine 3 before quenching and an effect as in the third embodiment can be achieved.

Of first clamping portion 33A and second clamping portion 33B, one member which clamps coil material 2 in the vertical direction and holds the coil material may also serve as power feed terminal 34. In this case, of first clamping portion 33A and second clamping portion 33B, the other member located opposite to one member with coil material 2 being interposed is provided to be unable to establish electrical connection with one member. A construction of press machine 3 can thus be simplified.

A function and effect of the method of manufacturing a rolling bearing ring according to the present third embodiment will now be described. In the method of manufacturing a rolling bearing ring according to the present third embodiment, steps of heating, punching, forming, and quenching coil material 2 are all performed as one step on press machine 3. Therefore, the manufacturing process can be shorter than in the method of manufacturing a rolling bearing ring in the comparative example in which the steps are separately performed. Consequently, cost for manufacturing a rolling bearing ring can further be reduced and a more inexpensive rolling bearing ring can be provided.

In the method of manufacturing a rolling bearing ring according to the present third embodiment, in obtaining the rolling bearing ring, the steel material is heated and punched while tensile force is applied to the steel material at least in one direction along the surface of the steel material. Therefore, quality of working of the obtained rolling bearing ring can be improved as compared with an example in which the steel material is heated and punched while no tensile force is applied to the steel material in obtaining the rolling bearing ring.

It could be confirmed that rolling bearing ring 11 manufactured with the method of manufacturing a rolling bearing ring according to the present third embodiment had high quality of working as a result of evaluation as below.

Figure 37:
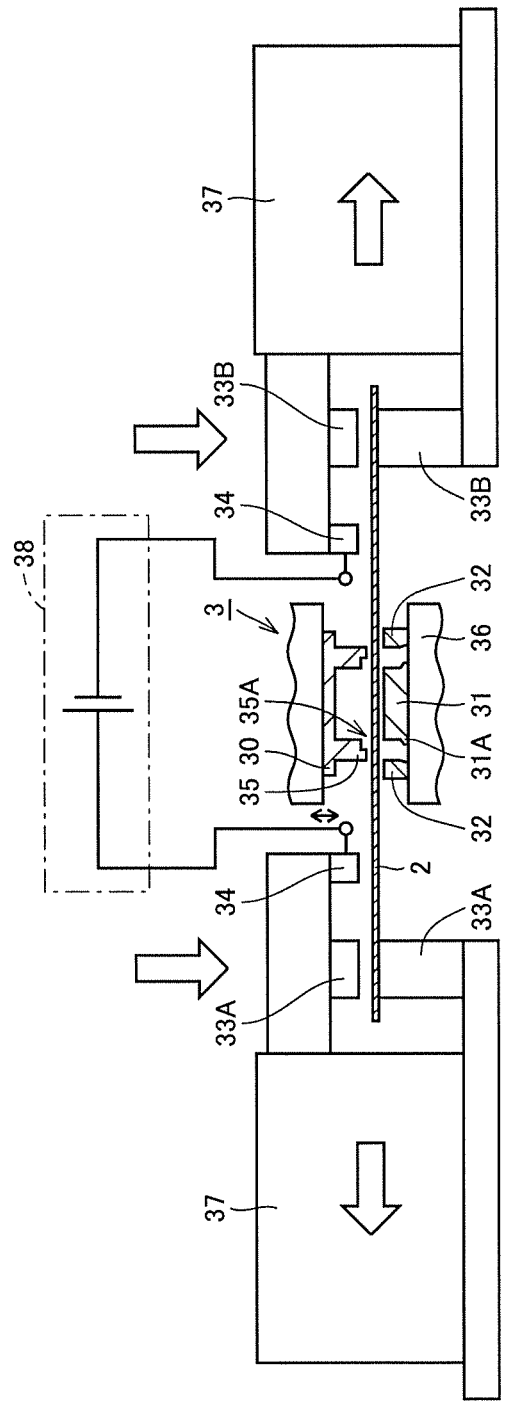
FIG. 37 is a schematic cross-sectional view showing an apparatus for manufacturing a rolling bearing ring used for manufacturing a rolling bearing ring according to an Example.

Specifically, the method of manufacturing a rolling bearing ring according to the present third embodiment was carried out with the use of coil material 2 formed of steel material SAE1070 and press machine 3 shown in FIG. 37. Press machine 3 shown in FIG. 37 was constructed such that first clamping portion 33A and one power feed terminal 34 were connected to one cylinder 37 and second clamping portion 33B and the other power feed terminal 34 were connected to another cylinder 37. Of first clamping portion 33A and second clamping portion 33B, one member which clamped coil material 2 in the vertical direction and held the coil material and power feed terminal 34 were constructed to be able to simultaneously be in contact with coil material 2. Of first clamping portion 33A and second clamping portion 33B, coil material 2 was arranged on the other member located opposite to one member with coil material 2 being interposed, and one member was brought in contact with coil material 2 by lowering one member so as to be able to bring power feed terminal 34 into contact with coil material 2.

While tensile force of 10 MPa was applied to coil material 2 in the direction of extension with the use of press machine 3 shown in FIG. 37, coil material 2 was subjected to direct resistance heating to 1000° C. which was a temperature not lower than the $A_1$ transformation point, and thereafter to die quenching.

Figure 38:
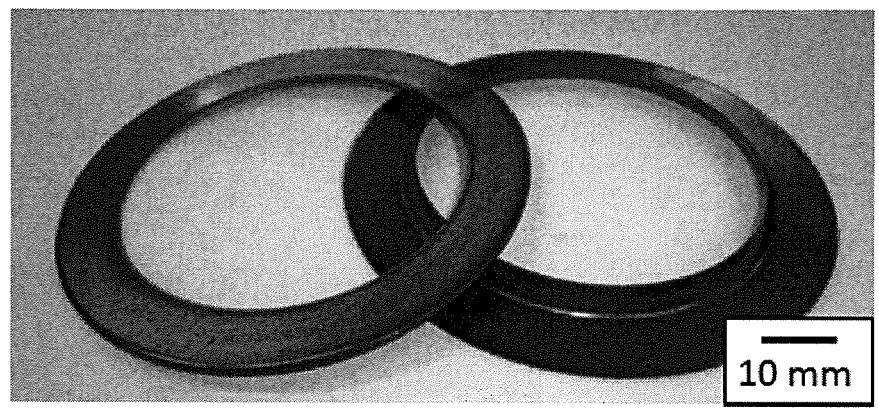
FIG. 38 shows a photograph of a rolling bearing ring according to the Example.
Figure 39:
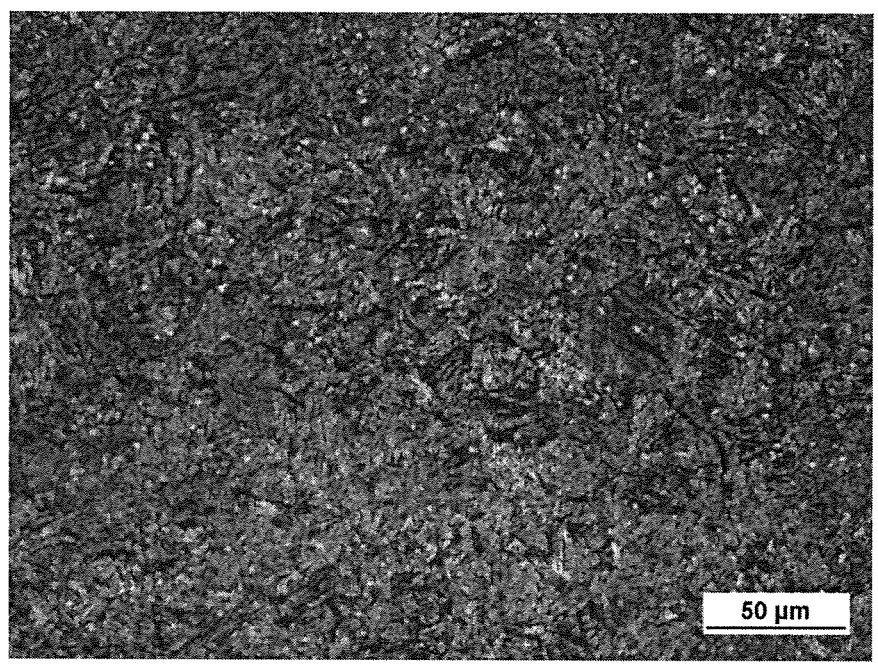
FIG. 39 shows a photograph of a steel structure in the rolling bearing ring according to the Example.

Rolling bearing ring 11 as shown in a photograph in FIG. 38 was thus manufactured. A Vickers hardness of a plurality of rolling bearing rings 11 (steel material: SAE1070) thus manufactured was measured, and consequently, an average hardness was approximately 790 HV. A part of rolling bearing ring 11 was cut, a cross-section thereof was corroded with nital, and a microstructure in the cross-section was observed with an optical microscope. Then, a martensite structure as in a photograph in FIG. 39 was observed.

A flatness of rolling bearing ring 11 was measured with the use of Talyrond, and consequently the flatness was approximately 10 μm. In contrast, a rolling bearing ring obtained by heating and punching coil material 2 while no tensile force was applied thereto in the step of obtaining a rolling bearing ring in the present third embodiment had a flatness of approximately 40 μm.

Thus, it was confirmed that, according to the method of manufacturing a rolling bearing ring according to the present third embodiment, the manufacturing process was shortened and rolling bearing ring 11 high in hardness and quality of working as a result of sufficient quenching could be manufactured.

Characteristic features of the present invention will be listed, although some are duplicate for the embodiments described above.

(1) A method of manufacturing a rolling bearing ring according to the present embodiment includes preparing a steel material (coil material 2) and a forming table (press machine 3) for obtaining the rolling bearing ring (11) from the steel material (2), setting the steel material (2) on the forming table (3), and obtaining the rolling bearing ring (11) by heating the steel material (2) on the forming table (3) to a temperature not lower than the $A_1$ transformation point, thereafter punching a part of the steel material (2) into a ring form, and thereafter quenching the steel material (2) in the ring form on the forming table (3). In the step of obtaining the raceway surface (11), the steel material (2) is heated and punched while tensile force is applied to the steel material (2) at least in one direction along the surface of the steel material (2).

In the method of manufacturing a rolling bearing ring according to the present embodiment, steps of heating, punching, and quenching the steel material (2) are all performed as one step on the forming table (3). Therefore, the manufacturing process can be shorter than in the conventional method of manufacturing a rolling bearing ring in which the steps are separately performed. Consequently, cost for manufacturing a rolling bearing ring can further be reduced and a more inexpensive rolling bearing ring (11) can be provided. Thus, according to the method of manufacturing a rolling bearing ring according to the present invention, the process for manufacturing a rolling bearing ring can be shortened.

In the method of manufacturing a rolling bearing ring according to the present embodiment, in obtaining the rolling bearing ring (11), the steel material (2) is heated and punched while tensile force is applied to the steel material (2) in at least one direction along the surface of the steel material (2). Therefore, quality of working of the obtained rolling bearing ring (11) can be improved as compared with an example in which the steel material is heated and punched while no tensile force is applied to the steel material in obtaining the rolling bearing ring.

Specifically, when a steel material is heated on the forming table to a temperature not lower than the $A_1$ transformation point without application of tensile force to the steel material, the steel material deforms due to heating. In particular, a rolling bearing ring of a thrust needle roller bearing tends to deform due to heating because a thickness thereof is small as described above. If such deformation occurs in the steel material, a deformed portion may be in contact with a part (for example, forming die 32) of the forming table (press machine 3). If such contact occurs, heat provided to the steel material is radiated from the contact portion to the forming table and hence heat distribution may be produced in the steel material (in particular, a portion to be worked, for example, a portion lying between portions held by two respective clamping portions) and there may be a region not heated to a temperature equal to or higher than the $A_1$ transformation point. Consequently, among rolling bearing rings obtained by heating of the steel material on the formed object to a temperature not lower than the $A_1$ transformation point without application of tensile force to the steel material and punching and quenching, some may be insufficient in quality of working due to poor heating caused by deformation.

When the steel material is punched on the forming table without application of tensile force to the steel material, the steel material is punched with deformation due to heating remaining in the steel material and hence accuracy in punching is disadvantageously low.

In contrast, in the method of manufacturing a rolling bearing ring according to the present embodiment, in obtaining the rolling bearing ring (11), the steel material (2) is heated while tensile force is applied to the steel material (2) in at least one direction along the surface of the steel material (2), so that deformation of the steel material (2) due to heating can be mitigated or suppressed. Consequently, since contact between the steel material (2) and the forming table (3) can be prevented, heat radiation from the steel material (2) to the forming table (3) through a part of the steel material (2) is suppressed and the entire portion to be worked of the steel material (2) can be heated to a temperature not lower than the $A_1$ transformation point.

In the method of manufacturing a rolling bearing ring according to the present embodiment, in obtaining the rolling bearing ring (11), the steel material (2) is punched on the forming table (3) while tensile force is applied to the steel material (2). Therefore, the steel material (2) which is heated in its entirety to a temperature not lower than the $A_1$ transformation point and of which deformation is mitigated or suppressed can be punched. Consequently, the rolling bearing ring (11) manufactured with the method of manufacturing a rolling bearing ring according to the present embodiment achieves suppression in lowering in accuracy in punching and it is highly accurately worked. Variation in quality of working is lessened in the rolling bearing ring (11).

(2) In the method of manufacturing a rolling bearing ring, the tensile force is higher than 0 MPa and not higher than 500 MPa.

Deformation of the steel material (2) due to heating can thus sufficiently be mitigated or suppressed. Consequently, the rolling bearing ring (11) thus obtained is inexpensive and high in quality of working.

(3) In obtaining the rolling bearing ring in the method of manufacturing a rolling bearing ring, the tensile force is applied to the steel material (2) by using at least any one of the supply portion (40) provided to be able to supply the steel material (2) to the forming table (3), the correction portion (50) provided to be able to correct distortion of the steel material (2) supplied from the supply portion (40) to the forming table (3), and the first clamping portion (33A) provided to be able to hold a part of the steel material (2) and the second clamping portion (33B) located opposite to the one with respect to the forming table (3) and provided to be able to hold another part of the steel material (2).

Thus, as at least any one of the supply portion (40), the correction portion (50), and the first clamping portion (33A) and the second clamping portion (33B) move relatively to each other so as to move away from each other while they hold the steel material (2), tensile force can be applied to the steel material (2) subjected to each step of heating and punching on the forming table (3). Thus, the rolling bearing ring (11) inexpensive and high in quality of working can be obtained.

(4) In the method of manufacturing a rolling bearing ring, the steel material in the ring form (formed object 2A in the ring form) may be formed on the forming table (3) before quenching. In forming, the inner circumferential portion or the outer circumferential portion of the steel material (2) in the ring form may be bent to be oriented in the direction of thickness of the steel material (2) in the ring form.

Thus, steps of heating, punching, forming, and quenching the steel material can all be performed as one step on the forming table (3). Consequently, the process for manufacturing a rolling bearing ring (11) can be shortened. A rolling bearing ring (11) for a thrust bearing in which the inner circumferential portion or the outer circumferential portion of the ring form is bent in the direction of thickness can be manufactured.

(5) In the method of manufacturing a rolling bearing ring, the steel material (2) may contain at least 0.4 mass % of carbon. The steel material (2) may have a thickness not greater than 2 mm. The steel material (2) may be punched into the ring form in the direction of the thickness.

Thus, the rolling bearing ring (11) high in hardness after it is quenched can be manufactured. By employing such a steel material (2) relatively small in thickness, punching of the steel material (2) is facilitated and the steel material (2) can sufficiently be quenched.

(6) In the method of manufacturing a rolling bearing ring, the steel material (2) may be heated with at least any method selected from the group consisting of electrical heating, indirect resistance heating, induction heating, contact heat transfer, and far-infrared heating. Thus, in the method of manufacturing a rolling bearing ring, any heating method can be adopted as a method of heating the steel material (2). In electrical heating, the steel material (2) may be heated by heat generation resulting from supply of a direct current or an alternating current to the steel material (2). Thus, in electrical heating, any of the direct current and the alternating current can be adopted.

(7) In the method of manufacturing a rolling bearing ring, the rolling bearing ring (11) having a hardness not lower than 700 HV may be obtained. Thus, in the method of manufacturing a rolling bearing ring, the manufacturing process is shortened and the rolling bearing ring (11) high in hardness after it is quenched can be manufactured by sufficiently quenching the steel material (11).

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

INDUSTRIAL APPLICABILITY

The method of manufacturing a rolling bearing ring according to the present invention is particularly advantageously applicable to a method of manufacturing a rolling bearing ring required to be shorter in manufacturing process. The rolling bearing ring according to the present invention is particularly advantageously applicable to a rolling bearing ring required to be lower in manufacturing cost.

REFERENCE SIGNS LIST 1 thrust needle roller bearing; 2 coil material; 3 press machine; 11 rolling bearing ring; 11A rolling bearing ring raceway surface; 12 needle roller; 12A rolling contact surface; 13 retainer; 30 press die; 31, 32, forming die; 31A, 32A projection portion; 33 support base; 34 power feed terminal; 35 pressing portion; 35A recess portion; 35B water cooling circuit; 36 base portion; 100 heated object; 101 power supply; 102 coil; 103 AC power supply; 104 internal heating roll; 105 external heating roll; 107 heat generator; B alternating magnetic flux; and I current (eddy current).

The invention claimed is:

1. A method of manufacturing a rolling bearing ring comprising:
    preparing a steel material and a forming table for obtaining the rolling bearing ring from the steel material;
    setting the steel material on the forming table; and
    obtaining the rolling bearing ring by heating the steel material on the forming table to a temperature not lower than an $A_1$ transformation point, thereafter punching a part of the steel material into a ring form, and thereafter quenching the steel material in the ring form on the forming table.

2. The method of manufacturing a rolling bearing ring according to claim 1, wherein in obtaining the rolling bearing ring, the steel material is heated and punched while tensile force is applied to the steel material in at least one direction along a surface of the steel material.

3. The method of manufacturing a rolling bearing ring according to claim 2, wherein the tensile force is higher than 0 MPa and not higher than 500 MPa.

4. The method of manufacturing a rolling bearing ring according to claim 2, wherein in obtaining the rolling bearing ring, the tensile force is applied to the steel material by using at least any one of a supply portion provided to be able to supply the steel material to the forming table, a correction portion provided to be able to correct distortion of the steel material supplied from the supply portion to the forming table, and a first clamping portion provided to be able to hold a part of the steel material and a second clamping portion located opposite to the one with respect to the forming table and provided to be able to hold another part of the steel material.

5. The method of manufacturing a rolling bearing ring according to claim 1, wherein the quenching is performed by bringing the steel material in the ring form into contact with it the forming table.

6. The method of manufacturing a rolling bearing ring according to claim 1, wherein the steel material in the ring form is formed on the forming table before the quenching.

7. The method of manufacturing a rolling bearing ring according to claim 6, wherein in the forming, an inner circumferential portion or an outer circumferential portion of the steel material in the ring form is bent to be oriented in a direction of thickness of the steel material in the ring form.

8. The method of manufacturing a rolling bearing ring according to claim 1, wherein in obtaining the rolling bearing ring, the steel material is heated with at least any one method selected from the group consisting of electrical heating, indirect resistance heating, induction heating, contact heat transfer, and far-infrared heating.

9. The method of manufacturing a rolling bearing ring according to claim 8, wherein in the electrical heating, the steel material is heated by heat generation resulting from supply of a direct current or an alternating current to the steel material.

10. The method of manufacturing a rolling bearing ring according to claim 1, wherein the steel material contains at least 0.4 mass % of carbon.

11. The method of manufacturing a rolling bearing ring according to claim 1, wherein the steel material has a thickness not greater than 2 mm and is punched into the ring form in a direction of the thickness.

12. The method of manufacturing a rolling bearing ring according to claim 1, wherein the rolling bearing ring having a hardness not lower than 700 HV is obtained.

13. The method of manufacturing a rolling bearing ring according to claim 1, wherein in the step of obtaining the rolling bearing ring by heating the steel material on the forming table to a temperature not lower than the $A_1$ transformation point, the steel material is heated to a temperature greater than or equal to 1000° C.

14. The method of manufacturing a rolling bearing ring according to claim 12, wherein the rolling bearing ring having a hardness not lower than 790 HV is obtained.

\* \* \* \* \*